(12) United States Patent
Kimura

(10) Patent No.: US 7,193,762 B1
(45) Date of Patent: Mar. 20, 2007

(54) SCANNING OPTICAL APPARATUS AND IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/518,241

(22) Filed: Sep. 11, 2006

(30) Foreign Application Priority Data

Sep. 27, 2005 (JP) .............................. 2005-280428

(51) Int. Cl.
*G02B 26/08* (2006.01)
*B41J 2/47* (2006.01)

(52) U.S. Cl. ...................... 359/216; 359/196; 359/217; 359/204; 347/232; 347/233; 347/243; 347/259

(58) Field of Classification Search ...................... None
See application file for complete search history.

(56) References Cited

U.S. PATENT DOCUMENTS 5,299,045 A * 3/1994 Sekiguchi .................... 398/95

FOREIGN PATENT DOCUMENTS

| JP | 2002-40350 | 2/2002 |
| JP | 2003-156704 | 5/2003 |
| JP | 2005-11997 | 1/2005 |

* cited by examiner

*Primary Examiner*—James Phan
(74) *Attorney, Agent, or Firm*—Fitzpatrick, Cella, Harper & Scinto

(57) ABSTRACT

A scanning optical apparatus having stable optical performance even if the characteristic of a vertical cavity surface emitting laser is fluctuated due to increase in drive current, and an image forming apparatus using the same are provided. The scanning optical apparatus comprises a converting optical system for converting a beam from the light source means having plural emission points into a beam of another state, deflecting means, and an imaging optical system for directing the deflected beam onto a scanning surface, and either pair of conditions is satisfied, $3 \leq Fnos < Fnom \leq 15$ and $d\theta s/dT < d\theta m/dT$, or
$3 \leq Fnom < Fnos \leq 15$ and $d\theta m/dT < d\theta s/dT$, where Fnom and Fnos represent F numbers of the light source means side of the converting optical system in main and sub-scanning directions, $\theta m$ and $\theta s$ half value angles of far field pattern in the main and sub-scanning directions, and $d\theta m/dT$ and $d\theta s/dT$ the fluctuations of $\theta m$ and $\theta s$ due to temperature change.

14 Claims, 11 Drawing Sheets

SCANNING OPTICAL APPARATUS AND IMAGE FORMING APPARATUS USING THE SAME

BACKGROUND OF THE INVENTION

1. Field of the Invention

This invention relates to a scanning optical apparatus and an image forming apparatus using the same, and is suitable for an image forming apparatus such as, for example, a laser beam printer (LBP), a digital copying machine or a multi-function printer having an electrophotographic printing process.

2. Description of the Prior Art

There have been proposed various scanning optical apparatuses for use in an image forming apparatus such as a laser beam printer, a digital copying machine or a multi-function printer having an electrophotographic printing process (see Japanese Patent Application Laid-open No. 2003-156704).

In such optical scanning apparatuses, a light beam (laser beam) emitted from light source means comprising, for example, a semiconductor laser or the like is converted into a parallel light beam by a collimator lens, and is directed to the deflecting and reflecting surface (deflecting surface) of a light deflector comprising a polygon mirror.

The light beam deflected by the light deflector is imaged into a spot shape on a surface to be scanned by an imaging optical system (fθ lens system), and the surface to be scanned is scanned at a constant speed with the light beam.

Also, in the scanning optical apparatus of this type, the parallel light beam emitted from the collimator lens is condensed on the deflecting and reflecting surface in a sub-scanning direction (in a sub-scanning cross section) orthogonal to a deflecting direction (main scanning direction) by a cylindrical lens.

Thereafter, an optical face tangle error correction optical system is used in which the light beam is re-imaged on the surface to be scanned by the imaging optical system.

In recent years, printing performance of a high printing speed and high definition has been required in the image forming apparatus such as the laser beam printer, the digital copying machine or the multi-function printer.

In any case, it is necessary to increase the frequency with which the surface to be scanned is scanned per unit time and therefore, this necessity has heretofore been coped with by increasing the number of surfaces of the polygon mirror or increasing the number of revolutions of the polygon mirror.

These methods, however, gives rise to a new problem that the polygon mirror becomes bulky and the load to a driving motor is increased to thereby produce a temperature rise, sound noise and the compactness of the apparatus is lost.

So, as methods of reducing the load to the light deflector, for example, various multi-beam scanning methods have been proposed in which the number of the light emitting points of a semiconductor laser which is light source means is increased so as to scan a surface to be scanned with a plurality of deflected light beams simultaneously.

The type of the light source of the multi-beam scanning method is divided broadly into two types.

A first type is a type in which a plurality of light source elements each emitting a single laser beam are arranged and a plurality of light beams are obtained by the use of optical path combining means such as a polarizing beam splitter or a half-mirror.

A second type is a so-called monolithic multi-beam type in which a plurality of light emitting points are constructed on a single light source element.

The first type can use a single laser emitting element easy and simple (inexpensive) to manufacture, while on the other hand, it requires beam combining means and this leads to the problem that the entire apparatus becomes complicated and bulky.

In contrast, the monolithic multi-beam type, if a light source element can only be manufactured, requires no beam combining means and can make a scanning optical apparatus simple and compact.

The light source element of this monolithic multi-beam type is divided broadly into two types. They are:
 a horizontal direction light emitting type; and
 a vertical direction light emitting type.

Any of these is manufactured by a semiconductor process, but they are classified by the emitting direction of the beam, a horizontal direction or a vertical direction to an element construction laminated on a wafer base surface.

In semiconductor lasers generally used at present, the horizontal direction light emitting type has become a mainstream because of the ease to manufacture. If a multi-beam light source is constituted by the horizontal direction light emitting type light source elements, the light beams are one-dimensionally arranged.

The horizontal direction light emitting type is sometimes called an edge emitter type.

In contrast, the vertical direction light emitting type light source element can emit a light beam vertically to the base surface thereof and therefore, light emitting points can be two-dimensionally arranged on the base surface, and this type is called a laser light source of a vertical cavity surface emitting type (hereinafter simply referred to as the "vertical cavity surface emitting laser").

This vertical cavity surface emitting laser can easily increase the number of light emitting points by being two-dimensionally arranged, and has been particularly attracting attention in recent years.

Various scanning optical apparatuses using the surface light emitting layer of this vertical direction light emitting type (see Japanese Patent Application Laid-open No. 2002-040350 and Japanese Patent Application Laid-open No. 2005-011997) have been proposed.

On the other hand, an optical element such as an image lens used in the scanning optical apparatus is generally formed by molding by a mold. The molding by a mold has the merit that if a mold is once made, even a lens of a complicated shape can be simply manufactured.

Also, an aspherical shape is positively adopted into molded articles to thereby facilitate an improvement in optical performance and the curtailment of the number of lenses. Particularly it has been devised from old times to make the lens surface aspherical in a main scanning direction, whereby improvements in coma aberration and fθ characteristic in the main scanning direction have been achieved.

When the vertical cavity surface emitting laser as described above is used as the light source means of the scanning optical apparatus, various problems shown below arise. It is known that in the vertical cavity surface emitting laser, as disclosed in Japanese Patent Application Laid-open No. 2002-040350 and Japanese Patent Application Laid-open No. 2005-011997, if a driving current increases, the emission angle of a light beam varies.

The emission angle of a laser beam can be obtained by evaluating the far field pattern (FFP) of a laser beam emitted from a laser light source with respect to the emission angle, where the far field pattern (FFP) is indicated by being normalized by the intensity of a light beam in the normal direction (angle 0°) of a laser element as shown in FIG. 10.

Here, a half value angle of the far field pattern refers to a beam pattern at a point far by several tens of millimeters or more from a laser emitting port.

As is generally known, the distribution of the far field pattern of a laser beam assumes a Gaussian distribution with respective to the emission angle.

Generally, an index representative of the expanse of a light beam is indicated by the difference between two angles at which the emitted beam intensity having the emission angle dependency becomes a half value of a peak value, and it is sometimes called FWHM (half value width). Herein, it is expressed as "the half value angle of the far field pattern".

The half value angle of the far field pattern of a vertical cavity surface emitting laser is narrower than that of the edge emitter laser, and generally is of the order of 10°–15°. Also, the difference between the half value angles of far field patterns in two planes containing the normal and orthogonal to each other is very small as compared with that of the edge emitter laser.

This is attributable to the fact that in the vertical cavity surface emitting laser, the diameter of a light emitting area is made small (generally several microns to 20 microns) for the stabilization of an oscillation mode and also, a light emitting portion laminated in a vertical direction on a laser substrate is constructed generally rotation-symmetrically.

On the other hand, it is also known that if the diameter of the light emitting area is made too small, the light emission amount becomes too small, and there is also a limit to making the diameter small.

In the vertical cavity surface emitting laser, if a drive current is increased (automatic power control: APC) to increase a light amount output or to compensate a reduction in light emitting efficiency due to a change in temperature of a substrate, the oscillation mode becomes unstable and mode distribution noise is liable to be caused. As the result, the emission angle of the light beam fluctuates as described above.

Depending on the structure of the laser element, in a popular vertical cavity surface emitting laser, the expanse angle of the light beam widens as the drive current increases, that is, a half angle value (FFP) of the far field pattern increases.

Also, it is known that the amount of the change is great in a direction and the amount of the change is small in another direction, as disclosed in FIG. 10 of Japanese Patent Application Laid-open No. 2005-011997. The angles 12°, 18° and 24° shown in the figure are the difference between two angles at which the beam intensity of the emission angle dependency of the emitted beam intensity becomes a half value of the peak value, as described above. Specifically, when the light intensity is viewed at a slice of 0.5, the emission angles are ±6°, ±9° and ±12°, respectively, and the differences are 12°, 18° and 24°, respectively.

In such a scanning optical system as disclosed in Japanese Patent Application Laid-open No. 2003-156704, a stop is provided in an optical path to thereby limit a light beam emitted from a laser light source and adjust the shape of the light beam to a particular shape.

Also, as described above, the cross section of the laser beam assumes a Gaussian distribution and therefore, on the pupil in the imaging optical system wherein the stop is imaged, the light intensity distribution assumes different intensities between the center of the pupil (pupil center) and the peripheral portion of the pupil (pupil edge portion).

If the emission angle of the light beam emitted from the laser light source=the expanse of the Gaussian distribution=FFP half value angle fluctuates, the light intensity distribution on the pupil also fluctuates. If for example, FFP half value angle widens, the light intensity distribution on the pupil also widens, and the light intensity ratio at the pupil end portions relative to the pupil center as the index of the light intensity distribution on the pupil also increases.

Consequently, the profile of an imaged spot on the image plane which can be calculated as the FFP of the pupil intensity distribution also fluctuates.

FIGS. 11 and 12 show how the imaged spot on the image plane is changed depending on the light intensity distribution on the pupil of the imaging optical system. FIG. 11 shows a change in the spot diameter on the best image plane def=0 and defocus def=3 mm, and the axis of abscissas indicates the light intensity ratio at the pupil edge portion to the pupil center as the index of the light intensity distribution on the pupil, and the axis of ordinates indicates $1/e^2$ (e being the base of natural logarithm) to the peak intensity as the spot diameter of the imaged spot. Also, FIG. 12 shows an image plane defocus change in the spot diameter, and the axis of abscissas indicates the defocus amount in the in-focus direction, and the axis of ordinates indicates $1/e^2$ to the peak intensity as the spot diameter of the imaged spot, and shows the light intensity ratio at the pupil edge portion relative to the pupil center as it is changed to 0.1–1.0.

As can be seen from FIGS. 11 and 12, the lower the ratio of the light intensity of the pupil edge portion becomes, the larger the spot diameter becomes, and conversely, the more the ratio of the light intensity of the pupil edge portion is increased, the smaller the spot diameter becomes.

That is, it can be seen that the FFP half value angle of the vertical cavity surface emitting laser shown in FIG. 10 has been fluctuated depending on the drive current as described above, and the ratio of the light intensity of the pupil edge portion has been fluctuated, whereby the spot diameter is also fluctuated.

If for example, the drive current is increased in an attempt to increase the light emission amount, the half value angle of the far field pattern widens and the ratio of the light intensity of the pupil edge portion becomes great, and the spot diameter becomes small.

It is known that in the electrophotographic printing process, a latent image is formed on the surface of a photosensitive member (photosensitive drum) by a laser spot, and the latent image is developed as a toner image by a known electrophotographic process, and is transferred to a recording medium (paper).

As is apparent from this, if a spot diameter forming the latent image is fluctuated, the size of the latent image is also changed.

For example, in a thin line as an image obtained by the dots of a laser spot being formed in a row, or a dot matrix as an image obtained by the dots of a laser spot being formed at a constant period, if the size of the laser spot changes, the line width of the thin line or the dot size of the dot matrix is changed.

In an image forming apparatus for a black-and-white image, the line width of the thin line or the dot size of the dot matrix is recognized as difference in density by an examinee.

Also, in an image forming apparatus for a color image, the line width of the thin line or the dot size of the dot matrix is recognized as a color difference by the examinee.

As described above, the stability of an image is aggravated by a change in the spot diameter.

SUMMARY OF THE INVENTION

The present invention has as its object to provide a scanning optical apparatus which can obtain stable optical performance even if the characteristic of a vertical cavity surface emitting laser is fluctuated by an increase in a drive current, and an image forming apparatus using the same.

According to one aspect of the invention, a scanning optical apparatus comprises light source means, a converting optical system for converting a light beam emitted from the light source means into a light beam of another state, deflecting means for deflecting and scanning the light beam passed through the converting optical system, and an imaging optical system for directing the light beam deflected by the deflecting means onto a surface to be scanned, wherein the light source means is a vertical cavity surface emitting laser having a plurality of light emitting points, and the either of the following conditional expressions is satisfied, $3 \leq Fnos < Fnom \leq 15$ and $d\theta s/dT < d\theta m/dT$ or $3 \leq Fnom < Fnos \leq 15$ and $d\theta m/dT < d\theta s/dT$ where Fnom and Fnos represent the F number of the light source means side of the converting optical system in a main scanning direction and the F number thereof in a sub-scanning direction, respectively, and $\theta m$ and $\theta s$ represent the half value angle of a far field pattern of the light beam emitted from the light source means in the main scanning direction and the half value angle of the far field pattern in the sub-scanning direction, respectively, and $d\theta m/dT$ and $d\theta s/dT$ represent the fluctuations of the half value angle $\theta m$ and $\theta s$ of the far field pattern when an environmental temperature has changed by dT relative to the half value angles $\theta m$ and $\theta s$ of the far field pattern, respectively.

According to a further aspect of the invention, the scanning optical apparatus includes a stop member for regulating the light beam from the converting optical system, and when the ratio of the intensity of the pupil edge portion of the light beam passing through the stop member to the intensity of the pupil center thereof is defined as $\eta$, the following conditional expression is satisfied, $0.35 < \eta < 1$.

According to a further aspect of the invention, in the scanning optical apparatus, the following conditional expression is satisfied, $0.50 < \eta < 1$, where $\eta$ represents the ratio of the intensity of the pupil edge portion of the light beam passing through the stop member to the intensity of the pupil center thereof.

According to a further aspect of the invention, in the scanning optical apparatus, the following conditional expression is satisfied, $182°/(Fno+5.5)-7.9° < \theta$ where Fno represents smaller one of the F number Fnom of the light source side of the converting optical system in the main scanning direction and the F number Fnos in the sub-scanning direction, and $\theta$ represents the half value angle of the far field pattern of the light beam emitted from the light source means in the direction of the smaller F number.

According to a further aspect of the invention, in the scanning optical apparatus, the condition that $412°/(Fno+9.9)-15.6° < \theta$ is satisfied.

According to another aspect of the invention, a scanning optical apparatus comprises light source means, a converting optical system for converting a light beam emitted from the light source means into a light beam of another state, deflecting means for deflecting and scanning the light beam passed through the converting optical system, and an imaging optical system provided with an optical element made of resin for directing the light beam deflected by the deflecting means onto a surface to be scanned, wherein the light source means is a laser light source of a surface light emitting type having a plurality of light emitting points, the fluctuation of a focus in a sub-scanning direction on the surface to be scanned when an environmental temperature fluctuates is greater than the fluctuation of the focus in a main scanning direction on the surface to be scanned when the environmental temperature fluctuates, and the following conditional expressions are satisfied, $d\theta m/dT < d\theta s/dT$ and $dSpot\_FFP/dT \times dSpot\_pint/dT < 0$, where $\theta m$ and $\theta s$ represent the half value angle of the far field pattern of the light beam emitted from the light source means in the main scanning direction and the half value angle of the far field pattern in the sub-scanning direction, respectively, and $d\theta m/dT$ and $d\theta s/dT$ represent the fluctuations of the half value angles $\theta m$ and $\theta s$ of the far field pattern when the environmental temperature changes by dT, respectively, and $dSpot\_FFP/dT$ represents the fluctuation of a spot diameter on the surface to be scanned due to the fluctuation of the half value angle of the far field pattern when the environmental temperature changes by dT, and $dSpot\_pint/dT$ represents the fluctuation of the spot diameter due to the fluctuation of a focus as the surface to be scanned when the environmental temperature changes by dT.

According to another aspect of the invention, an image forming apparatus comprises the scanning optical apparatus set out in the foregoing, a photosensitive member disposed on the surface to be scanned, a developing device for developing an electrostatic latent image formed on the photosensitive member by a light beam scanned by the scanning optical apparatus as a toner image, a transferring device for transferring the developed toner image to a transfer material, and a fixing device for fixing the transferred toner image on the transfer material.

According to another aspect of the invention, an image forming apparatus comprises the scanning optical apparatus set out in the foregoing, and a printer controller for converting code data inputted from an external device and inputting it to the scanning optical apparatus.

According to another aspect of the invention, a color image forming apparatus comprises a plurality of image bearing members disposed on the surface to be scanned of the scanning optical apparatus set out in the foregoing for forming images of different colors thereon.

According to a further aspect of the invention, the color image forming apparatus comprises a printer controller for converting a color signal inputted from an external device into image data of a different color and inputting it each scanning optical apparatus.

According to the present invention, there can be achieved a scanning optical apparatus in which each element is appropriately set so as to satisfy a conditional expression, whereby stable optical performance can be obtained even if the characteristic of a laser light source of a surface light emitting type is fluctuated by an increase in a drive current, and an image forming apparatus using the same.

DESCRIPTION OF THE PREFERRED EMBODIMENTS

Some embodiments of the present invention will hereinafter be described with reference to the drawings.

Figure 1A:
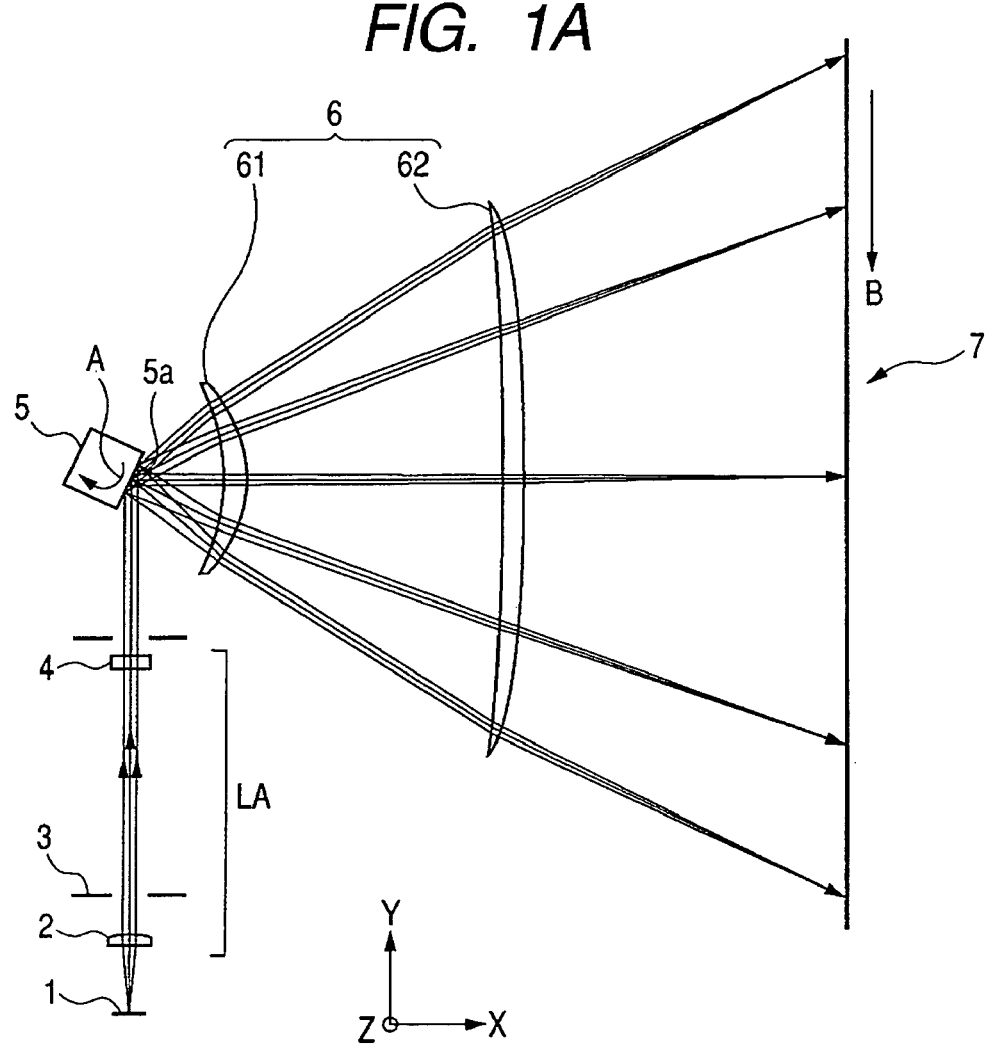
FIG. 1A is a main scanning cross-sectional view of Embodiment 1 of the present invention.
Figure 1B:
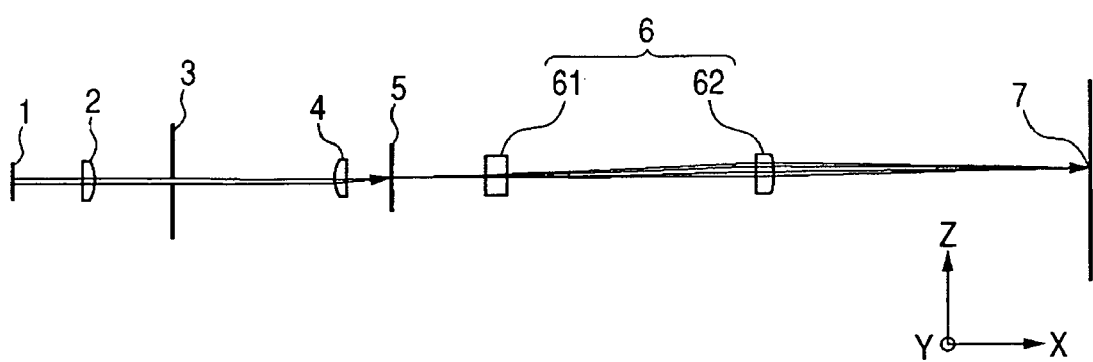
FIG. 1B is a sub-scanning cross-sectional view of Embodiment 1 of the present invention.

FIG. 1A is a cross-sectional view of the essential portions (main scanning cross-sectional view) of Embodiment 1 of the scanning optical apparatus of the present invention in a main scanning direction, and FIG. 1B is a cross-sectional view of the essential portions (sub-scanning cross-sectional view) of Embodiment 1 of the scanning optical apparatus of the present invention in a sub-scanning direction.

In the following description, the main scanning direction is a direction perpendicular to the rotational axis of a rotary polygon mirror and the optical axis of an imaging optical system (a direction in which a light beam is reflected and deflected (deflected and scanned) by the rotary polygon mirror). The sub-scanning direction is a direction parallel to the rotational axis of the rotary polygon mirror. Also, the main scanning cross section is a plane containing the main scanning direction and the optical axis of the imaging optical system. Also, the sub-scanning cross section is a cross section perpendicular to the main scanning cross section.

Description will now be made of the construction and optical action of FIGS. 1A and 1B.

In FIGS. 1A and 1B, the reference numeral 1 designates light source means comprising a laser light source (vertical cavity surface emitting laser) of a single surface light emitting type having a plurality of light emitting points. The plurality of light emitting points are disposed at intervals in the sub-scanning direction.

The reference numeral 2 denotes a collimator lens as a converting optical system, and it converts a light beam emitted from the light source means 1 into a parallel light beam.

The reference numeral 3 designates an aperture stop (stop member) for regulating the width of the light beam, and it limits a passed light beam and shapes the beam shape (a cross section to the optical axis is of an elliptical shape).

The reference numeral 4 denotes a lens system (cylindrical lens) as a second optical system, and it has finite power only in the sub-scanning direction, and causes the light beam passed through the aperture stop 3 to be imaged as a linear image on the deflecting surface (reflecting surface) 5a of a light deflector 5 which will be described later in the sub-scanning cross section.

Each of the collimator lens 2, the aperture stop 3 and the cylindrical lens (cylinder lens) 4 constitutes an element of an incidence optical system LA. Also, the collimator lens 2 and the cylindrical lens 4 may be constituted by an optical element (anamorphic lens).

The reference numeral 5 designates the light deflector as deflecting means, and it comprises a polygon mirror (rotary polygon mirror) of a four-surface construction inscribed to for example, φ20 (a circle having a diameter of 20 mm), and is rotated at a constant speed in the direction of arrow A in FIG. 1A by driving means (not shown) such as a motor. The width of the deflecting and reflecting surface (deflecting surface) 5a of the polygon mirror 5 in the present embodiment in the main scanning direction is 14.1 mm.

The reference numeral 6 denotes an imaging optical system (fθ lens system) having first and second imaging lenses 61 and 62 made of resin (plastic). In the imaging optical system 6, a light beam based on image information and reflected and deflected by the light deflector 5 is imaged on a photosensitive drum surface 7 as a surface to be scanned, and the deflecting surface 5a of the light deflector 5 and the photosensitive drum surface 7 are brought into a conjugate relation in the sub-scanning cross section to thereby effect the optical face tangle error correction.

The first and second imaging lenses 61 and 62 formed of resin are both manufactured by a known molding technique of filling a metal mold with resin, and the resin is demolded after cooling. Thereby, they can be manufactured more simply (inexpensively) than a conventional imaging lens using a glass lens.

The first imaging lens 61 has power chiefly in the main scanning direction as shown in Table 1 which will be described later, and the lens surface shape thereof comprises an aspherical shape expressed by the functions of given expressions (a)–(d) which will be described later. In the main scanning cross section, the first imaging lens 61 comprises a meniscus shape of which the incidence surface is of a non-arcuate shape and of which the concave surface faces the light deflector 5 side. In the sub-scanning cross section, the first imaging lens 61 is of a shape of which the incidence surface is of a planar shape and the emergence surface is of a convex shape having power, and is a convex shape of which the curvature gradually changes from on the axis to off the axis in Y direction (main scanning direction), and is in a symmetrical shape in Y direction and Z direction (sub-scanning direction) with respect to the optical axis. However, the incidence surface need not always be completely flat, but may have more or less power.

On the other hand, the second imaging lens 62 comprises an anamorphic lens differing in power between in the main scanning direction and in the sub-scanning direction as shown in Table 1 which will be described later. The second imaging lens 62 is such that the incidence surface thereof is of an aspherical shape expressed by a function given by the expression formula A of Table 1 and the emergence surface is of an aspherical shape expressed by a function given by the expression formula B of Table 1. Particularly the emergence surface comprises a non-arcuate shape (sub-scanning non-arcuate) in the sub-scanning cross section.

In the second imaging lens 62, the power in the sub-scanning cross section is greater than that in the main scanning cross section, and in the main scanning cross section, the incidence surface thereof comprises an arcuate shape and the emergence surface thereof comprises a non-arcuate shape. Also, the lens surface shape of the second imaging lens 62 in the main scanning cross section is asymmetrical with respect to the optical axis. The lens surface shape in the sub-scanning cross section is a concave surface shape in which the curvature of the incidence surface changes in Y direction from on the axis to off the axis, and the emergence surface is of a non-arcuate shape in the sub-scanning direction as well and a convex surface shape in which the curvature gradually changes in Y direction from on the axis to off the axis, and is of an asymmetrical shape in Y direction with respect to the optical axis.

The focal length in the sub-scanning direction of the first imaging lens 61 is shorter than that of the second imaging lens 62, as shown in Table 1. That is, the first imaging lens 61 is greater in power than the second imaging lens 62. It bears the imaging chiefly in the sub-scanning direction and the correction of some aberrations in the main scanning direction for the incident light beam.

The shapes of the first and second imaging lenses 61 and 62 need not always be represented by function expression formulas using such an asymmetrical amount as shown in Table 1, but may be represented by known expression formulas or expressing methods equivalent thereto. Also, the first and second imaging lenses 61 and 62 need not always be such that the symmetry and asymmetry with respect to the optical axis are in such a relation as in the present embodiment, but may be of a known construction.

The reference numeral 7 designates the photosensitive drum surface as the surface to be scanned.

The numerical data of the scanning optical apparatus according to the present embodiment will now be shown in Table 1 below. The unit of length is "mm". This also applies hereinafter.

TABLE 1

|  | surface No. | curvature (main) | curvature (sub) | surface interval | refractive index |
|---|---|---|---|---|---|
| light source 1 | 0 |  |  | 18.245 |  |
| Collimator lens 2 R1 | 1 | ∞ | ∞ | 3.000 | 1.762 |
| Collimator lens 2 R2 | 2 | −15.216 | −15.216 | 10.000 |  |
| Stop 3 | 3 | ∞ | ∞ | 9.372 |  |
| cylindrical lens 4 R1 | 4 | ∞ | 38.085 | 3.000 | 1.762 |
| cylindrical lens 4 R2 | 5 | ∞ | ∞ | 46.500 |  |
| polygon mirror 5 | 6 | ∞ | ∞ | 24.200 |  |
| 1st imaging lens 61 R1 | 7 | aspherical surface (discrete table) | aspherical surface (discrete table) | 6.000 | 1.524 |
| 1st imaging lens 61 R2 | 8 | aspherical surface (discrete table) | aspherical surface (discrete table) | 65.495 |  |
| 2nd imaging lens 62 R1 | 9 | aspherical surface (discrete table) | aspherical surface (discrete table) | 5.000 | 1.524 |
| 2nd imaging lens 62 R2 | 10 | aspherical surface (discrete table) | aspherical surface (discrete table) | 83.559 |  |
| surface to be scanned 7 | 11 |  |  |  |  |

| 7th surface Expression Formula A | | | | | | | |
|---|---|---|---|---|---|---|---|
| Meridian Line Upper | | Meridian Line Lower | | Sagittal Line Upper | | Sagittal Line Lower | |
| R | −5.55E+01 |  |  | r |  | ∞ |  |
| Ku | 2.80E+00 | Kl | 2.80E+00 | D2u | 0.00E+00 | D2l | 0.00E+00 |
| B4u | 3.90E−06 | B4l | 3.90E−06 | D4u | 0.00E+00 | D4l | 0.00E+00 |
| B6u | −5.84E−09 | B6l | −5.84E−09 | D6u | 0.00E+00 | D6l | 0.00E+00 |
| B8u | 5.23E−12 | B8l | 5.23E−12 | D8u | 0.00E+00 | D8l | 0.00E+00 |
| B10u | 6.34E−15 | B10l | 6.34E−15 | D10u | 0.00E+00 | D10l | 0.00E+00 |

TABLE 1-continued

8th surface Expression Formula A

| | Meridian Line Upper | | Meridian Line Lower | | Sagittal Line Upper | | Sagittal Line Lower |
|---|---|---|---|---|---|---|---|
| R | −3.32E+01 | | | r | −1.83E+01 | | |
| Ku | −2.04E−01 | K1 | −2.04E−01 | D2u | 3.28E−04 | D21 | 3.28E−04 |
| B4u | 9.51E−07 | B41 | 9.51E−07 | D4u | 0.00E+00 | D41 | 0.00E+00 |
| B6u | −2.97E−11 | B61 | −2.97E−11 | D6u | 0.00E+00 | D61 | 0.00E+00 |
| B8u | −9.80E−12 | B81 | −9.80E−12 | D8u | 0.00E+00 | D81 | 0.00E+00 |
| B10u | 9.38E−15 | B101 | 9.38E−15 | D10u | 0.00E+00 | D101 | 0.00E+00 |

9th surface Expression Formula A

| | Meridian Line Upper | | Meridian Line Lower | | Sagittal Line Upper | | Sagittal Line Lower |
|---|---|---|---|---|---|---|---|
| R | −6.00E+02 | | | R | −5.43E+01 | | |
| Ku | 0.00E+00 | K1 | 0.00E+00 | D2u | −1.60E−05 | D21 | −1.60E−05 |
| B4u | 0.00E+00 | B41 | 0.00E+00 | D4u | −1.41E−08 | D41 | −1.41E−08 |
| B6u | 0.00E+00 | B61 | 0.00E+00 | D6u | 0.00E+00 | D61 | 0.00E+00 |
| B8u | 0.00E+00 | B81 | 0.00E+00 | D8u | 0.00E+00 | D81 | 0.00E+00 |
| B10u | 0.00E+00 | B101 | 0.00E+00 | D10u | 0.00E+00 | D101 | 0.00E+00 |

TABLE 2

10th surface Expression Formula B

| | Meridian Line R | | Meridian Line Lower |
|---|---|---|---|
| R | −1.16E+03 | | |
| Ku | −5.63E+01 | K1 | −4.63E+01 |
| B4u | −3.09E−07 | B41 | −8.27E−07 |
| B6u | 1.44E−11 | B61 | 1.07E−10 |
| B8u | −7.86E−16 | B81 | −1.05E−14 |
| B10u | 0.00E+00 | B101 | 0.00E+00 |
| E02 | −2.00E−02 | | |
| E12 | 1.76E−06 | | |
| E04 | 3.54E−07 | | |
| E22 | 1.17E−06 | | |
| E14 | −7.53E−09 | | |
| E32 | 3.82E−10 | | |
| E24 | −8.02E−10 | | |
| E42 | −5.95E−10 | | |
| E52 | −3.39E−14 | | |
| E44 | 1.42E−12 | | |
| E62 | 1.28E−13 | | |
| E64 | −3.18E−16 | | |
| E82 | −1.50E−17 | | |

| | |
|---|---|
| Fθ coefficient | 150.0 |
| main scanning focal length of G1 | 144.1 |
| sub-scanning scanning focal length of G1 | 35.0 |
| main scanning focal length of G2 | −2371.1 |
| sub-scanning scanning focal length of G2 | −294.5 |
| sub-scanning magnification of Fθ | 1.89 |
| focal length of condensing lens 2 | 20.0 |
| focal length of cylindrical lens 4 | 50.0 |
| main scanning longitudinal magnification of entire system βm2 | 56.4 |
| sub-scanning longitudinal magnification of entire system βm2 | 22.36 |
| main scanning width of elliptical stop | 3.2 |
| sub-scanning width of elliptical stop | 1.8 |
| light source side main scanning F-number Fnom | 6.2 |
| light source side sub-scanning F-number Fnos | 11.1 |
| Deflector | circumcircle φ20/4-surface reflecting surface |

However, the Expression Formula A of the surface shapes of the first and second imaging lenses 61 and 62 is defined as follows:

The surface shapes of the first and second imaging lenses 61 and 62: Expression Formula A Assuming that the surface shape in the main scanning direction is an aspherical surface shape which can be represented by functions up to the 10th order, the intersection with the optical axis is defined as the origin, the direction of the optical axis is defined as the x-axis, a direction orthogonal to the optical axis in the main scanning plane is defined as the y-axis, and a direction orthogonal to the optical axis in the sub-scanning plane is defined as the z-axis, the meridian line direction corresponding to the main scanning direction is represented by $$X = \frac{Y^2/R}{1 + (1 - (1+K)(Y/R)^2)^{1/2}} + B_4 Y^4 + B_6 Y^6 + B_8 Y^8 + B_{10} Y^{10} \tag{a}$$

where R represents the radius of curvature, K, $B_4$, $B_6$, $B_8$ and $B_{10}$ represent aspherical surface coefficients, and the sagittal line direction corresponding to the sub-scanning direction (a direction containing the optical axis and orthogonal to the main scanning direction) is represented by $$S = \frac{Z^2/r'}{1 + (1 - (Z/r')^2)^{1/2}} \tag{b}$$

where $r' = r0(1 + D_2 Y^2 + D_4 Y^4 + D_6 Y^6 + D_8 Y^8 + D_{10} Y^{10})$, r0 represents the radius of curvature of the sagittal line on the optical axis, and $D_2$, $D_4$, $D_6$, $D_8$ and $D_{10}$ represent coefficients. And the Expression Formula B of the surface shape of the second imaging lens 62 having an aspherical surface shape in the sub-scanning cross section is defined as follows.

The surface shape of the second imaging lens 2: Expression Formula B

Assuming that the surface shape in the main scanning direction is an aspherical surface shape which can be represented by functions up to the 10th order, the intersection with the optical axis is defined as the origin, the direction of the optical axis is defined as the x-axis, a direction orthogonal to the optical axis in the main scanning plane is defined as the y-axis, and a direction orthogonal to the optical axis in the sub-scanning plane is defined as the z-axis, the meridian line direction corresponding to the main scanning direction is represented by $$X = \frac{Y^2/R}{1+(1-(1+K)(Y/R)^2)^{1/2}} + B_4Y^4 + B_6Y^6 + B_8Y^8 + B_{10}Y^{10} \quad (c)$$

where R represents the radius of curvature, and K, $B_4$, $B_6$, $B_8$ and $B_{10}$ are aspherical surface coefficients, and the sagittal amount S' from the meridian line corresponding to the sub-scanning direction (a direction containing the optical axis and orthogonal to the main scanning direction) is represented by $$S' = \Sigma E_{ij} Y^i Z^j, \quad (d)$$

where $E_{ij}$ is a coefficient, and i and j are integers equal to 0 or greater. At this time, j=2 represents a spherical surface component in the sub-scanning direction, and j≠2 gives a non-arcuate shape in the sub-scanning direction indicating an aspherical surface amount in the sub-scanning direction.

In the present embodiment, a plurality of divergent light beams emitted from the vertical cavity surface emitting laser 1 are converted into a parallel light beam by the collimator lens 2 constituting the converting optical system, and this light beam (the quantity of light) is limited by the aperture stop 3, and is incident on the cylindrical lens 4. The parallel light beam incident on the cylindrical lens (cylinder lens) 4 emerges intactly therefrom in the main scanning cross section, and converges and is imaged as a substantially linear image (a linear image long in the main scanning direction) on the deflecting surface 5a of the light deflector 5 in the sub-scanning cross section. The plurality of light beams reflected and deflected by the deflecting surface 5a of the light deflector 5 are imaged into a spot shape on the photosensitive drum surface 7 through the first and second imaging lenses 61 and 62, and optically scans on the photosensitive drum surface 7 at a uniform speed in the direction of arrow B (the main scanning direction) by the light deflector 5 being rotated in the direction of arrow A. Thereby, image recording is effected on the photosensitive drum surface 7 serving as a recording medium.

Figure 2:
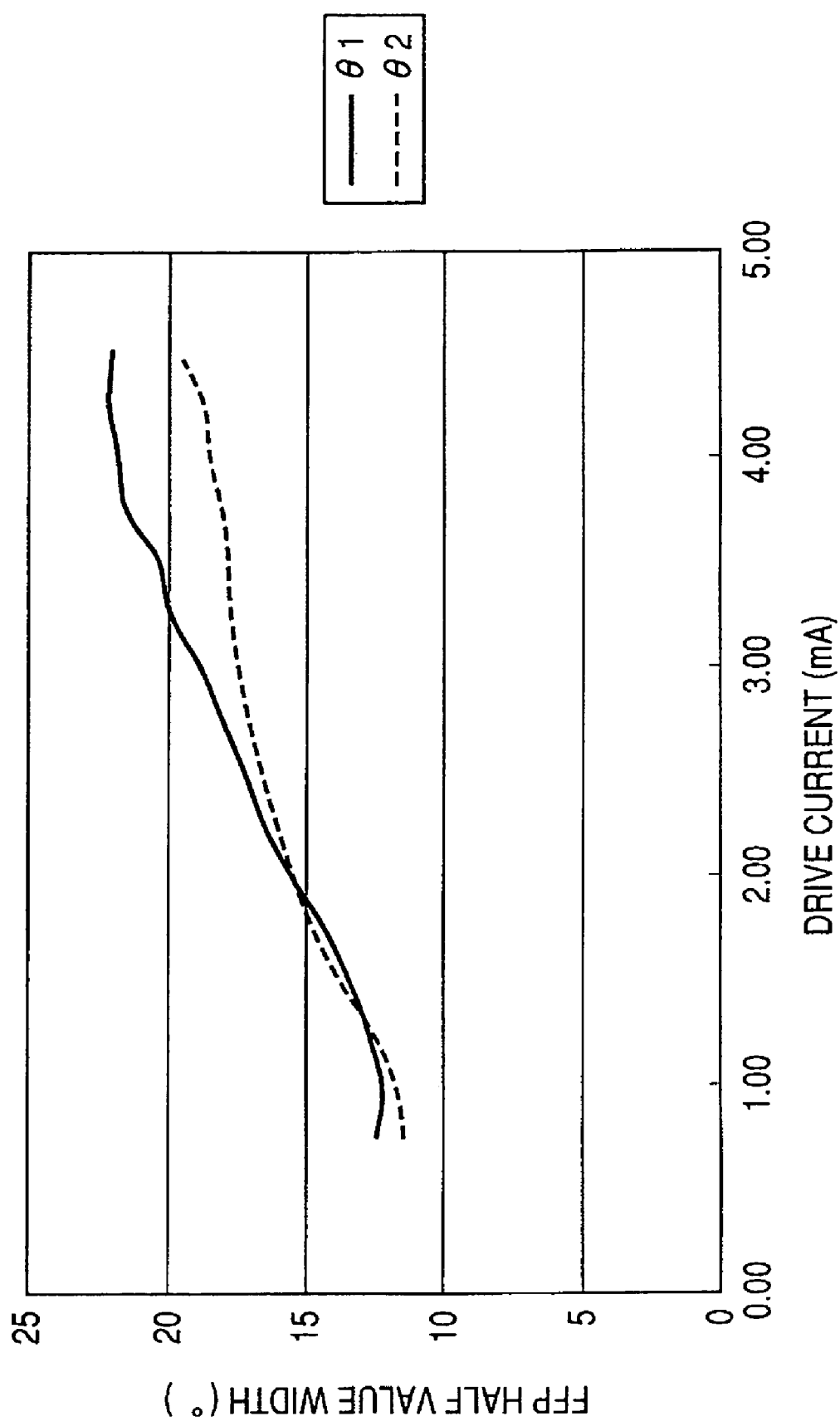
FIG. 2 shows the characteristic of a vertical cavity surface emitting laser in Embodiment 1 of the present invention.

FIG. 2 is a characteristic graph showing the characteristic of the half value angle of the far field pattern (half value width of FFP) of the vertical cavity surface emitting laser 1.

In FIG. 2, the axis of abscissas represents a drive current, and the axis of ordinates represents the half value angle (°) of the far field pattern. θ1 and θ2 are the half value angles (°) of the far field pattern in two cross sections containing a normal and orthogonal to each other. The vertical cavity surface emitting laser 1 differs in the amount of change in the half value angle of the far field pattern, depending on the direction, due to the structure thereof, as shown in the conventional example. In FIG. 2, the half value angle of the far field pattern in the cross section greater in the amount of change is defined as θ1, and the half value angle of the far field pattern in a direction orthogonal to this cross section is defined as θ2.

The vertical cavity surface emitting laser 1 increases in the drive current as the rise in the element temperature T and therefore, the temperature dependency of the half value angles of the far field pattern in FIG. 2 becomes dθ2/dT<dθ1/dT.

On the other hand, according to Table 1 above, the following conditional expression is satisfied, 3≦Fnom<Fnos≦15.

where Fnom represents the F number in the main scanning direction, of the vertical cavity surface emitting laser 1 side of the collimator lens (first optical system) 2 constituting the converting optical system, and Fnos represents the F number thereof in the sub-scanning direction.

If the F numbers in the main scanning and sub-scanning directions are less than 3, the influence of spherical aberration will become great and it becomes difficult to make the spot diameter minute. Also, the F numbers are greater than 15, the transmission efficiency of the quantity of light becomes bad.

Here, the vertical cavity surface emitting laser is provided so that the half value angle θ2 of the far field pattern in the main scanning direction of the scanning optical apparatus and the half value angle θ1 of the far field pattern in the sub-scanning direction thereof may coincide with each other. Thereby, the half value angle θm=θ2 of the far field pattern in the main scanning direction and the half value angle θs=θ1 of the far field pattern in the sub-scanning direction and therefore, dθm/dT=dθ2/dT and dθs/dT=dθ1/dT.

Also, as can be seen from FIG. 2, dθ2/dT<dθ1/dT and therefore, dθm/dT<dθs/dT.

That is, in the present embodiment, assuming that the fluctuations of the half value angles θm and θs of the far field pattern in the main scanning direction and the sub-scanning direction, respectively, with respect to the change in environmental temperature by dT are defined as dθm/dT and dθs/dT, respectively, each element is set so as to satisfy the conditions that $$3 \leq Fnom < Fnos \leq 15 \text{ and } d\theta m/dT < d\theta s/dT. \quad (2)$$

Further, in the present embodiment, as shown in Table 1, of the first and second imaging lenses 61 and 62 constituting the converting optical system 6, the first imaging lens 61 greatest in the power in the sub-scanning direction is made of a resin lens, as described above.

Figure 3:
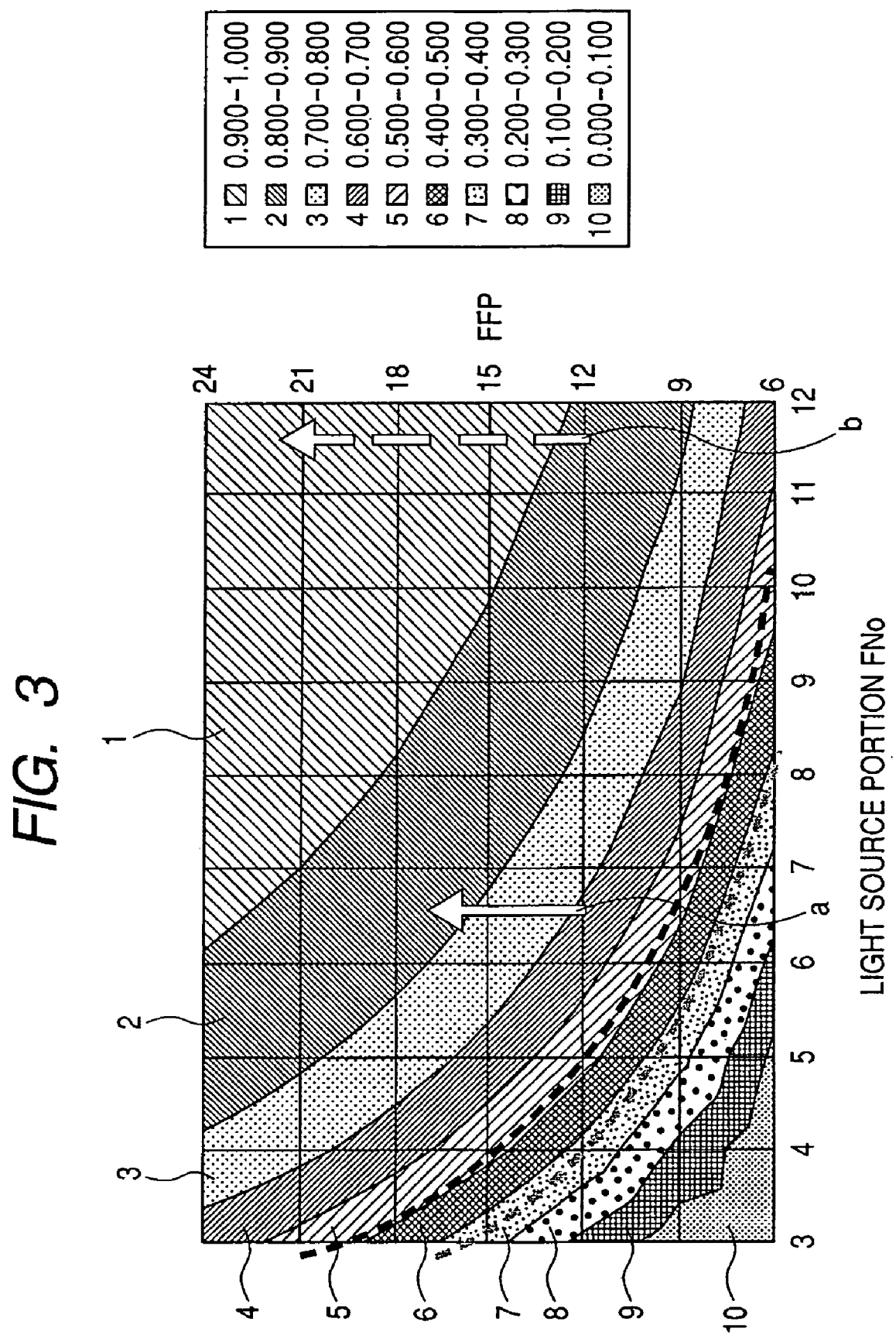
FIG. 3 illustrates the ratio characteristic of the quantity of light of a pupil edge portion in Embodiment 1 of the present invention.

Next, FIG. 3 shows the relations between the F number (Fno) of the vertical cavity surface emitting laser 1 side of the collimator lens (first optical system) constituting the converting optical system and the half value angle of FFP, with taking the ratio η of the light intensity of the pupil edge portion to the intensity of the pupil center of the light beam passing through the stop members as parameter. In FIG. 3, the axis of abscissas represents the Fno of the vertical cavity surface emitting laser 1 side, the axis of ordinates represents the half value angle of the far field pattern, and the ratio η of the light intensity of the pupil edge portion is area-indicated at the unit of 0.1.

From Table 1 above, the F number Fnom of the vertical cavity surface emitting laser 1 side of the collimator lens in the main scanning direction and the F number Fnos thereof in the sub-scanning direction are Fnom=6.2 and Fnos=11.1, respectively.

Also, from FIG. 2, the half value angles of FFP at the low drive current (1 mA) of the vertical cavity surface emitting laser 1 in the present embodiment are θm=θ2=θs=θ1=12°; and the half value angles of the far field pattern at a high drive current (4 mA) are θm=θ2=17° and θs=θ1=21°.

At this time, as indicated by arrow a in FIG. 3, the ratio η of the light intensity of the pupil edge portion in the main scanning direction has changed to $$\eta=0.65\rightarrow0.80,$$

and as indicated by arrow b, the ratio η of the light intensity of the pupil edge portion in the sub-scanning direction has changed to $$\eta=0.86\rightarrow0.94.$$

If the half value angles θ1 and θ2 of the far field pattern are converse between the main scanning direction and the sub-scanning direction, the ratio η of the light intensity of the pupil edge portion to the intensity of the pupil center in the main scanning direction becomes $$\eta=0.65\rightarrow0.87,$$

and the ratio η of the light intensity of the pupil edge portion in the sub-scanning direction becomes $$\eta=0.86\rightarrow0.91,$$

and the fluctuation of the ratio η of the light intensity in the main scanning direction becomes very great.

Figure 4:
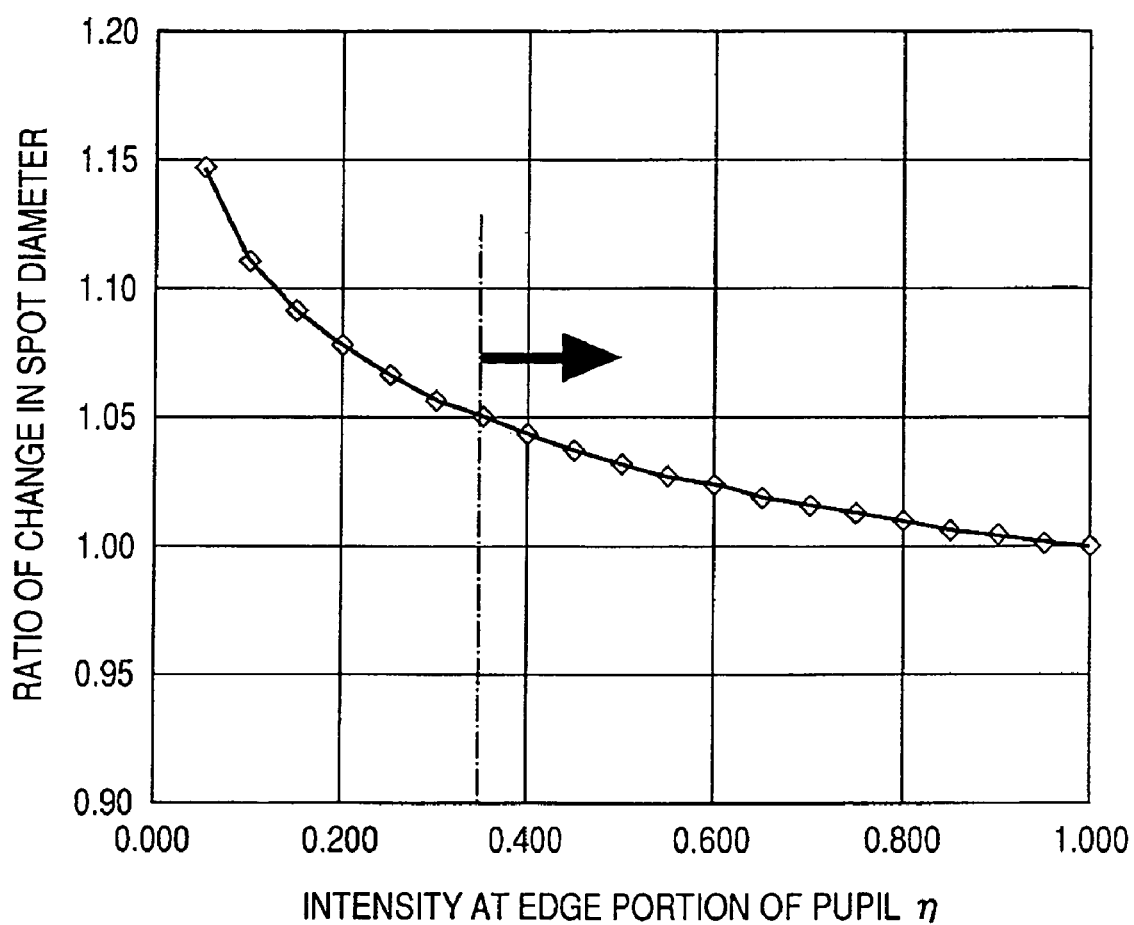
FIG. 4 illustrates the relation between the ratio of the quantity of light of the pupil edge portion and a spot diameter in Embodiment 1 of the present invention.

Next, FIG. 4 shows how the spot diameter fluctuates relative to the ratio η of the light intensity of the pupil edge portion to the intensity of the pupil center of the light beam passing through the stop member. In FIG. 4, the spot diameter is indicated by being normalized with the time when η=1.00 as 1.

As shown in FIG. 4, it can be seen that the spot diameter is fluctuated by 15% or more by the value of the ratio η of the light intensity of the pupil edge portion. As previously described, in the construction of the present embodiment, the ratio η of the light intensity of the pupil edge portion in the main scanning direction changes to $$\eta=0.65\rightarrow0.80,$$

and the spot diameter is fluctuated by −1.0%. The ratio η of the light intensity of the pupil edge portion in the sub-scanning direction changes to η=0.86→0.94, and it can be seen that the spot diameter is fluctuated by −0.5%.

In contrast, if the FFP half value angles θ1 and θ2 in the respective main scanning direction and the sub-scanning direction are converse to each other, as previously described, in the construction of the present embodiment, the ratio η of the light intensity of the pupil edge portion in the main scanning direction changes to $$\eta=0.65\rightarrow0.87,$$

and the spot diameter is fluctuated by −1.5%. The ratio η of the light intensity of the pupil edge portion in the sub-scanning direction changes to $$\eta=0.86\rightarrow0.91$$

and thus, the spot diameter is fluctuated by −0.2%, and it can be seen that the fluctuation in the spot diameter in the main scanning direction in the present embodiment is small, and that the difference in the fluctuation in the spot diameter in the sub-scanning direction is slight.

Thus, in the present embodiment, as described above, each element is set so as to satisfy the conditional expression (2), whereby even when the half value angle of the far field pattern of the vertical cavity surface emitting laser is fluctuated, the fluctuation of the spot diameter can be greatly reduced. That is, in the present embodiment, the direction in which the fluctuation of the half value angle of the far field pattern is small is turned in the direction in which the F number is bright.

Also, in the present embodiment, it can be seen from FIG. 4 that the following condition is satisfied. That is, the smaller the fluctuation of the spot diameter is, the better it is. How much it should be reduced depends on the level of the required performance of the product. In an image forming apparatus for business use of which the stability of images is required, the fluctuation of the spot diameter generally need be 3% or less. It can be seen from FIG. 4 that if the ratio η of the light intensity of the pupil edge portion is within the range of $$0.50<\eta<1, \quad (3)$$

the fluctuation of the spot diameter is 3% or less.

In an image forming apparatus used for general consumer use, the fluctuation of the spot diameter generally need be 5% or less. It can be seen from FIG. 4 that if the ratio η of the light intensity of the pupil edge portion to the intensity of the pupil center of the light beam passing through the stop member is within the range of $$0.35<\eta<1, \quad (4)$$

the fluctuation of the spot diameter is 5% or less.

Further, it can also be seen that when the highest stability is required, in order to make the fluctuation of the spot diameter 2% or less, the aforementioned ratio η can be set within the range of $$0.65<\eta<1. \quad (5)$$

Next, it can be seen from FIG. 3 that the following condition is satisfied.

That is, assuming Fno being the smaller one (brighter one) between the F number Fnom of the vertical cavity surface emitting laser 1 side of the collimator lens (first optical system) 2 constituting the converting optical system in the main scanning direction and the F number Fnos in the sub-scanning direction, and θ (°) being the half value angle of the far field pattern (FFP) of the light beam emitted from the vertical cavity surface emitting laser 1 in the same direction, the area satisfying $$182°/(Fno+5.5)-7.9°<\theta \quad (6)$$

is an area above a wave line indicated by 7 in FIG. 3, and is an area in which the ratio η of the light intensity of the pupil edge portion is within the range of $$0.35<\eta<1.$$

If as described above, the ratio η of the light intensity of the pupil edge portion to the intensity of the pupil center of the light beam passing through the stop member is within this range, from FIG. 4, the fluctuation of the spot diameter is 5% or less, and this is allowable as the fluctuation of the spot diameter in the image forming apparatus used for general consumer use.

Further, the area satisfying $$412°/(Fno+9.9)-15.6°<\theta \quad (7)$$

is an area above a wave line indicated by 5 in FIG. 3, and is an area in which the ratio η of the light intensity of the pupil edge portion is $$0.50<\eta<1.$$

If as described above, the ratio η of the light intensity of the pupil edge portion is within this range, the fluctuation of the spot diameter is 3% or less from FIG. 4, and it is allowable as the fluctuation of the spot diameter in an image forming apparatus used as the image forming apparatus for business use of which the stability of images is required.

Figure 5:
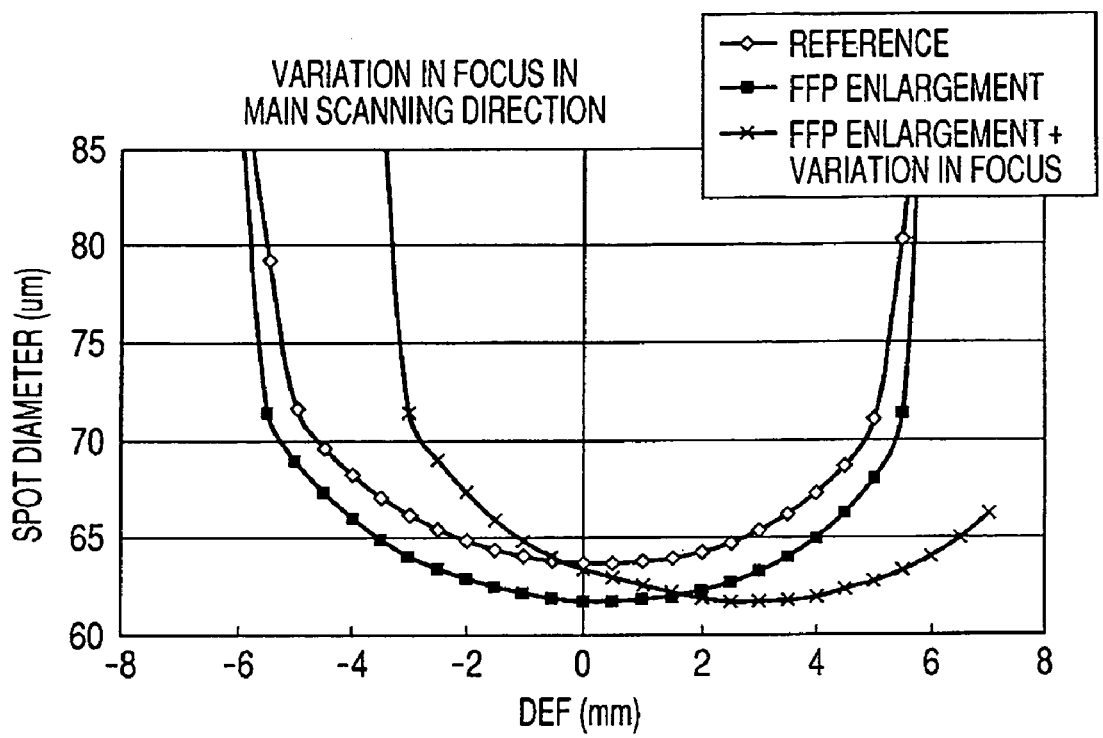
FIG. 5 illustrates the spot defocus characteristic of Embodiment 1 of the present invention in a main scanning direction.
Figure 6:
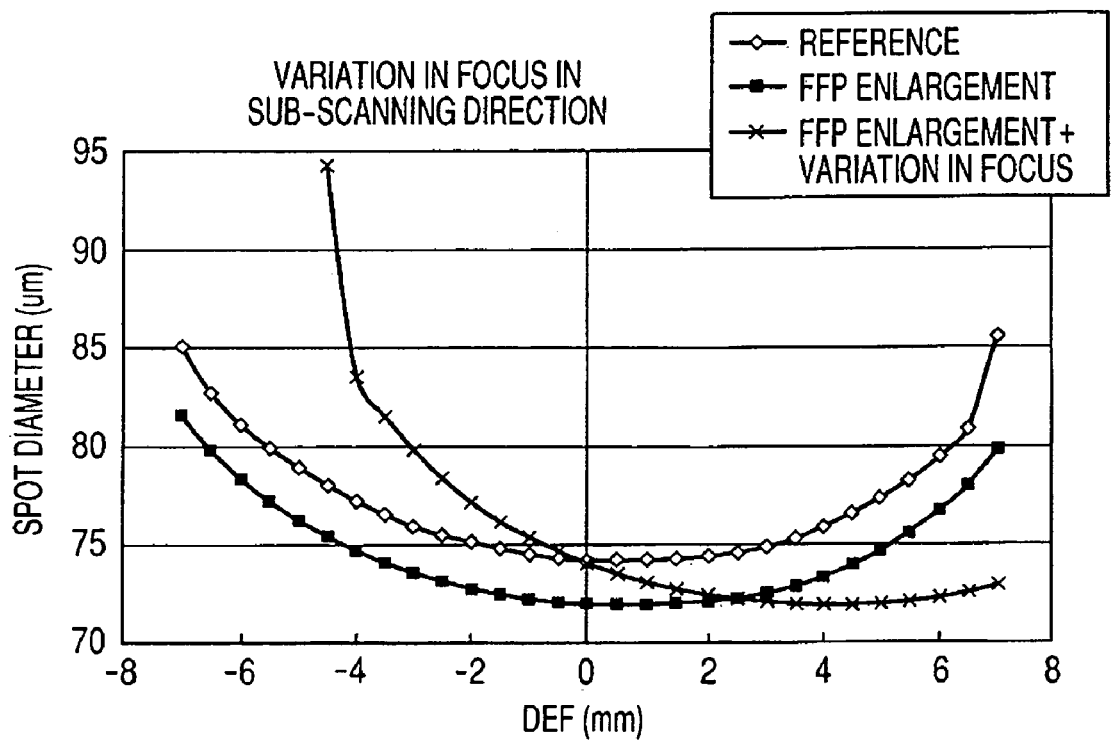
FIG. 6 illustrates the spot defocus characteristic of Embodiment 1 of the present invention in a sub-scanning direction.

Next, FIGS. 5 and 6 show the spot defocus characteristics in the main scanning direction and the sub-sub-scanning direction. In FIGS. 5 and 6, the axis of abscissas represents the defocus amount (DEF) from a reference image plane, and the axis of ordinates represents the spot diameter.

When the temperature in the apparatus rises and the drive current of the vertical cavity surface emitting laser is increased, the half value angle of the far field pattern fluctuates as shown in FIG. 2, thus resulting in such a spot defocus characteristic with respect to the reference state as shown in FIG. 6.

As is apparent from FIGS. 5 and 6, the spot diameter becomes small in each defocus. Usually the surface to be scanned (photosensitive drum) is provided at the position of DEF=0. The fluctuation of the spot diameter due to the fluctuation of the half value angle of the far field pattern depending on the change in the environmental temperature dT, dSpot_FFP/dT, satisfies the following condition, $$d\text{Spot\_FFP}/dT < 0 \quad (8)$$

On the other hand, the first and second imaging lenses 61 and 62 are both made of resin. And it is known that a resin lens is liable to be fluctuated in its focal length by the fluctuation of the environmental temperature. In the case of the present embodiment, the variation in focus per 25° C. is +0.67 mm in the main scanning direction, and is +0.80 mm in the sub-scanning direction, and therefore, the variation in the sub-scanning direction is greater.

That is, in the optical system of the present embodiment, the variation in the focus in the sub-scanning direction on the surface to be scanned due to the change in the environmental temperature is greater than that in the main scanning direction.

In any case, the focus varies towards the plus side. This is shown in FIGS. 5 and 6. In FIGS. 5 and 6, by the focus having varied in the plus direction, the spot diameter is increased in both of the main scanning direction and the sub-scanning direction at DEF=0. That is, the variation in the spot diameter due to the variation in the focus when the environmental temperature has changed by dT, dSpot_pint/dT, satisfies the following conditional expression, $$0 < d\text{Spot\_pint}/dT. \quad (9)$$

Combining the with the above-mentioned conditional expression (8), the following conditional expression can be obtained, $$d\text{Spot\_FFP}/dT \times d\text{Spot\_pint}/dT < 0 \quad (10)$$

That is, in the present embodiment, by satisfying the conditional expression (10), whereby as shown in FIGS. 5 and 6, the variation in the spot diameter with respect to the reference state due to the fluctuation of the half value angle of the far field pattern, and the variation in the spot diameter with respect to the reference state due to the variation in the focus are offset by each other to thereby reduce the variation in the focus.

While in the present embodiment, the incident light beam onto the light deflector 5 is assumed to be a parallel light beam, it is not always restricted thereto, but may be, for example, a convergent light beam or a divergent light beam.

Also, while in the present embodiment, the imaging optical system 6 is assumed to be constituted by two lenses, but it is not restricted thereto, but may be constituted, for example, by a single lens or three or more lenses. Also, the imaging optical system may include a diffraction optical element.

Embodiment 2

Figure 7:
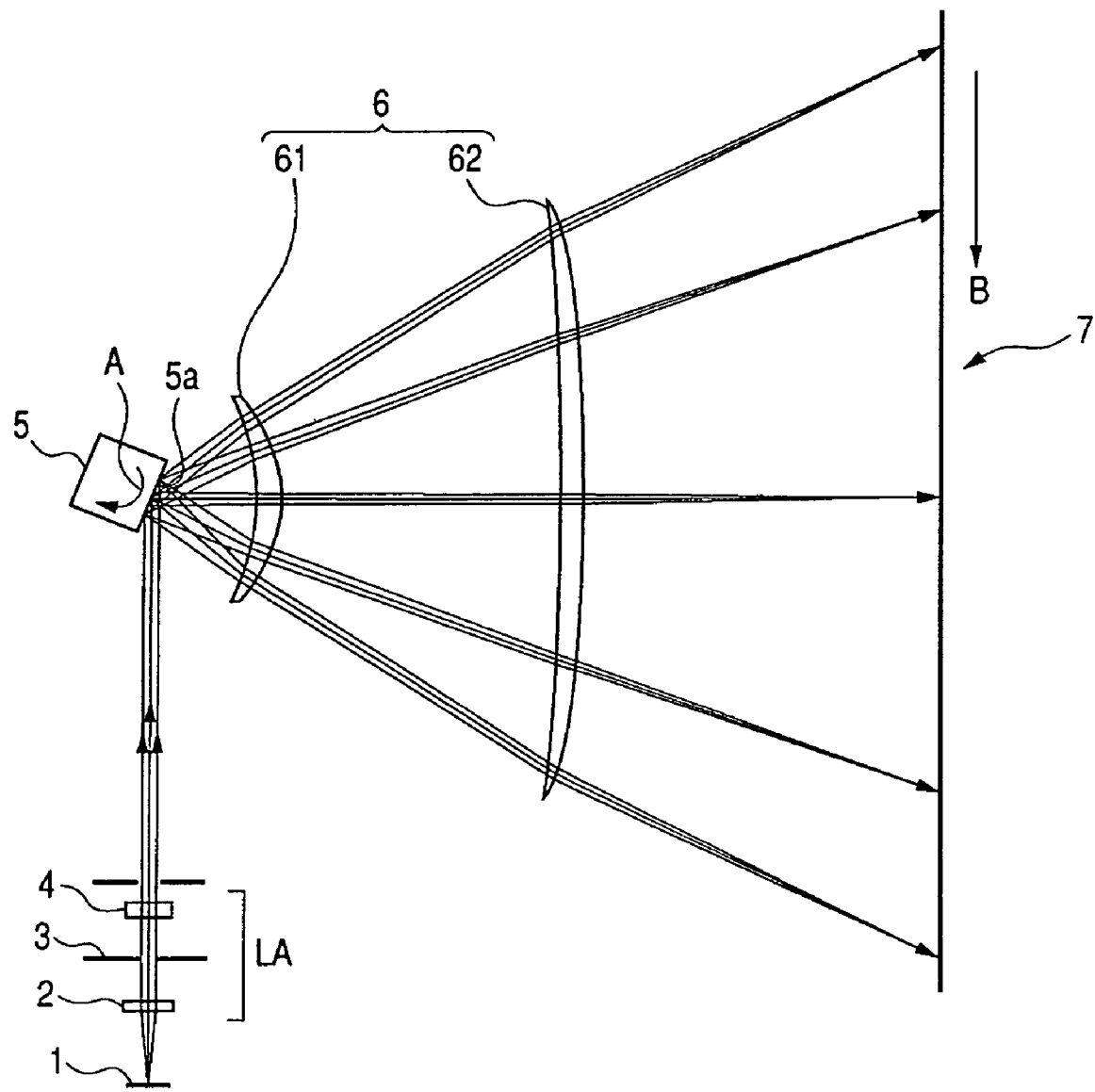
FIG. 7 is a main scanning cross-sectional view of Embodiment 2 of the present invention.

FIG. 7 is a cross-sectional view of the essential portions (main scanning cross-sectional view) of Embodiment 2 of the scanning optical apparatus of the present invention in the main scanning direction. In FIG. 7, the same elements as the elements shown in FIG. 1 are given the same reference characters.

The difference of the present embodiment from the aforedescribed Embodiment 1 is that the F number Fnom, in the main scanning direction, of the vertical cavity surface emitting laser 1 side of the collimator lens (first optical system) 2 constituting the converting optical system is different from the F number thereof in the sub-scanning direction in magnitude relation thereof. In the other points, the construction and optical action of the present embodiment are similar to those of Embodiment 1, whereby a similar effect can be obtained.

That is, in the present embodiment, as shown in Table 3 which will be described later, the F number Fnom of the vertical cavity surface emitting laser 1 side of the collimator lens in the main scanning direction and the F number Fnos thereof in the sub-scanning direction are made different in magnitude relation therebetween from that in Embodiment 1, and each element is set so as to satisfy the conditional expression (1) which will be described later.

In the present embodiment, the characteristic of the half value angle of the far field pattern of the vertical cavity surface emitting laser 1 is equal to that in the aforedescribed Embodiment 1, as shown in FIG. 2.

The numerical data of the scanning optical apparatus according to the present embodiment will now be shown in Table 3. The expression formulas are similar to those in the aforedescribed Embodiment 1.

A first imaging lens is referred to as G1, and a second imaging lens is referred to as G2.

TABLE 3

|  | surface No. | curvature (main) | curvature (sub) | surface interval | refractive index |
|---|---|---|---|---|---|
| light source 1 | 0 |  |  | 18.245 |  |
| collimator lens 2 R1 | 1 | ∞ | ∞ | 3.000 | 1.762 |
| collimator lens 2 R2 | 2 | −15.216 | −15.216 | 10.000 |  |
| stop 3 | 3 | ∞ | ∞ | 9.372 |  |
| cylindrical lens 4 R1 | 4 | ∞ | 76.167 | 3.000 | 1.762 |
| cylindrical lens 4 R2 | 5 | ∞ | ∞ | 99.300 |  |
| polygon mirror 5 | 6 | ∞ | ∞ | 24.200 |  |

TABLE 3-continued

| | | | | | | |
|---|---|---|---|---|---|---|
| 1st imaging lens 61 R1 | | 7 | aspherical surface (discrete table) | aspherical surface (discrete table) | 6.000 | 1.524 |
| 1st imaging lens 61 R2 | | 8 | aspherical surface (discrete table) | aspherical surface (discrete table) | 65.495 | |
| 2nd imaging lens 62 R1 | | 9 | aspherical surface (discrete table) | aspherical surface (discrete table) | 5.000 | 1.524 |
| 2nd imaging lens 62 R2 | | 10 | aspherical surface (discrete table) | aspherical surface (discrete table) | 83.559 | |
| surface to be scanned 7 | | 11 | | | | |

| 7th surface Expression Formula A | | | | | | | |
|---|---|---|---|---|---|---|---|
| Meridian Line Upper | | Meridian Line Lower | | Sagittal Line Upper | | Sagittal Line Lower | |
| R | −5.55E+01 | | | r | ∞ | | |
| Ku | 2.80E+00 | K1 | 2.80E+00 | D2u | 0.00E+00 | D21 | 0.00E+00 |
| B4u | 3.90E−06 | B41 | 3.90E−06 | D4u | 0.00E+00 | D41 | 0.00E+00 |
| B6u | −5.84E−09 | B61 | −5.84E−09 | D6u | 0.00E+00 | D61 | 0.00E+00 |
| B8u | 5.23E−12 | B81 | 5.23E−12 | D8u | 0.00E+00 | D81 | 0.00E+00 |
| B10u | 6.34E−15 | B101 | 6.34E−15 | D10u | 0.00E+00 | D101 | 0.00E+00 |

| 8th surface Expression Formula A | | | | | | | |
|---|---|---|---|---|---|---|---|
| Meridian Line Upper | | Meridian Line Lower | | Sagittal Line Upper | | Sagittal Line Lower | |
| R | −3.32E+01 | | | r | −1.83E+01 | | |
| Ku | −2.04E−01 | K1 | −2.04E−01 | D2u | 3.28E−04 | D21 | 3.28E−04 |
| B4u | 9.51E−07 | B41 | 9.51E−07 | D4u | 0.00E+00 | D41 | 0.00E+00 |
| B6u | −2.97E−11 | B61 | −2.97E−11 | D6u | 0.00E+00 | D61 | 0.00E+00 |
| B8u | −9.80E−12 | B81 | −9.80E−12 | D8u | 0.00E+00 | D81 | 0.00E+00 |
| B10u | 9.38E−15 | B101 | 9.38E−15 | D10u | 0.00E+00 | D101 | 0.00E+00 |

| 9th surface Expression Formula A | | | | | | | |
|---|---|---|---|---|---|---|---|
| Meridian Line Upper | | Meridian Line Lower | | Sagittal Line Upper | | Sagittal Line Lower | |
| R | −6.00E+02 | | | R | −5.43E+01 | | |
| Ku | 0.00E+00 | K1 | 0.00E+00 | D2u | −1.60E−05 | D21 | −1.60E+05 |
| B4u | 0.00E+00 | B41 | 0.00E+00 | D4u | −1.41E−08 | D41 | −1.41E−08 |
| B6u | 0.00E+00 | B61 | 0.00E+00 | D6u | 0.00E+00 | D61 | 0.00E+00 |
| B8u | 0.00E+00 | B81 | 0.00E+00 | D8u | 0.00E+00 | D81 | 0.00E+00 |
| B10u | 0.00E+00 | B101 | 0.00E+00 | D10u | 0.00E+00 | D101 | 0.00E+00 |

TABLE 4

10th surface Expression Formula B

| | Meridian Line R | | Meridian Line Lower |
|---|---|---|---|
| R | −1.16E+03 | | |
| Ku | −5.63E+01 | K1 | −4.63E+01 |
| B4u | −3.09E−07 | B41 | −8.27E−07 |
| B6u | 1.44−E11 | B61 | 1.07E−10 |
| B8u | −7.86−E16 | B81 | −1.05E−14 |
| B10u | 0.00E+00 | B101 | 0.00E+00 |
| E02 | −2.00E−02 | | |
| E12 | 1.76E−06 | | |
| E04 | 3.54E−07 | | |
| E22 | 1.17E−06 | | |
| E14 | −7.53E−09 | | |
| E32 | 3.82E−10 | | |
| E24 | −8.02E−10 | | |
| E42 | −5.95E−10 | | |
| E52 | −3.39E−14 | | |
| E44 | 1.42E−12 | | |
| E62 | 1.28E−13 | | |
| E64 | −3.18E−16 | | |
| E82 | −1.50E−17 | | |

| | |
|---|---|
| F$\theta$ coefficient | 150.0 |
| main scanning focal length of G1 | 144.1 |
| sub-scanning scanning focal length of G1 | 35.0 |
| main scanning focal length of G2 | −2371.1 |
| sub-scanning scanning focal length of G2 | −294.5 |
| sub-scanning magnification of F$\theta$ | 1.89 |
| focal length of condensing lens 2 | 20.0 |
| focal length of cylinder 4 | 100.0 |
| main scanning longitudinal magnification of entire system $\beta m2$ | 56.4 |
| sub-scanning longitudinal magnification of entire system $\beta s2$ | 89.44 |
| main scanning width of elliptical stop | 3.2 |
| sub-scanning width of elliptical stop | 3.6 |
| light source side main scanning FNo | 6.2 |
| light source side sub-scanning FNo | 5.5 |
| Deflector | circumcircle $\phi$20/4-surface reflecting surface |

According to Table 3 above, the F number Fnom, in the main scanning direction, of the vertical cavity surface emitting laser 1 side of the collimator lens 2 constituting the converting optical system satisfies the following conditional expression with respect to the F number Fnos in the sub-scanning direction:

$3 \leq Fnos < Fnom \leq 15$.

Here, the vertical cavity surface emitting laser is provided so that the half value angle $\theta 1$ of the far field pattern in the main scanning direction of the scanning optical apparatus and the half value angle $\theta 2$ of the far field pattern in the sub-scanning direction may coincide with each other. Thereby, the half value angle of the far field pattern in the main scanning direction $\theta m = \theta 1$, and the half value angle of the far field pattern in the sub-scanning direction $\theta s = \theta 2$ and therefore, $d\theta m/dT = d\theta 1/dT$ and
$d\theta s/dT = d\theta 2/dT$.

Also, as can be seen from FIG. 2, $d\theta 2/dT < d\theta 1/dT$ and therefore, it can be seen that $d\theta s/dT < d\theta m/dT$.

That is, in the present embodiment, each element is set so as to satisfy the following conditions that $$3 \leq Fnos < Fnom \leq 15 \text{ and } d\theta s/dT < d\theta m/dT \quad (1)$$

From Table 3 above, in the present embodiment, the F number Fnom, in the main scanning direction, of the vertical cavity surface emitting laser 1 side of the collimator lens constituting the converting optical system and the F number Fnos in the sub-scanning direction are Fnom=6.2 and
Fnos=5.5, respectively.

Also, from FIG. 2, the half value angle of the far field pattern at the low drive current (1 mA) of the vertical cavity surface emitting laser in the present embodiment is $\theta m = \theta 2 = \theta s = \theta 1 = 12°$, and the half value angle of the far field pattern at a high drive current (4 mA) is $\theta m = \theta 1 = 21°$,
$\theta s = \theta 2 = 17°$.

At this time, from FIG. 3, the ratio of the light intensity of the pupil edge portion in the main scanning direction changes as $\eta = 0.65 \to 0.87$, and the ratio of the light intensity of the pupil edge portion in the sub-scanning direction has changed to $\eta = 0.57 \to 0.76$.

If the half value angles $\theta 1$ and $\theta 2$ of the far field patterns in the main scanning direction and the sub-scanning direction are converse, the ratio $\eta$ of the light intensity of the pupil edge portion in the main scanning direction is $\eta = 0.65 \to 0.80$, and the ratio $\eta$ of the light intensity thereof of the pupil edge portion in the sub-scanning direction is $\eta = 0.57 \to 0.84$, and the fluctuation of the ratio of the light intensity in the main scanning direction will become very great.

Thus, in the present embodiment, as described above, each element is set so as to satisfy the conditional expression (1), whereby even when the half value angle of the far field pattern of the vertical cavity surface emitting laser is fluctuated, the fluctuation of the spot diameter can be greatly reduced.

[Image Forming Apparatus]

Figure 8:
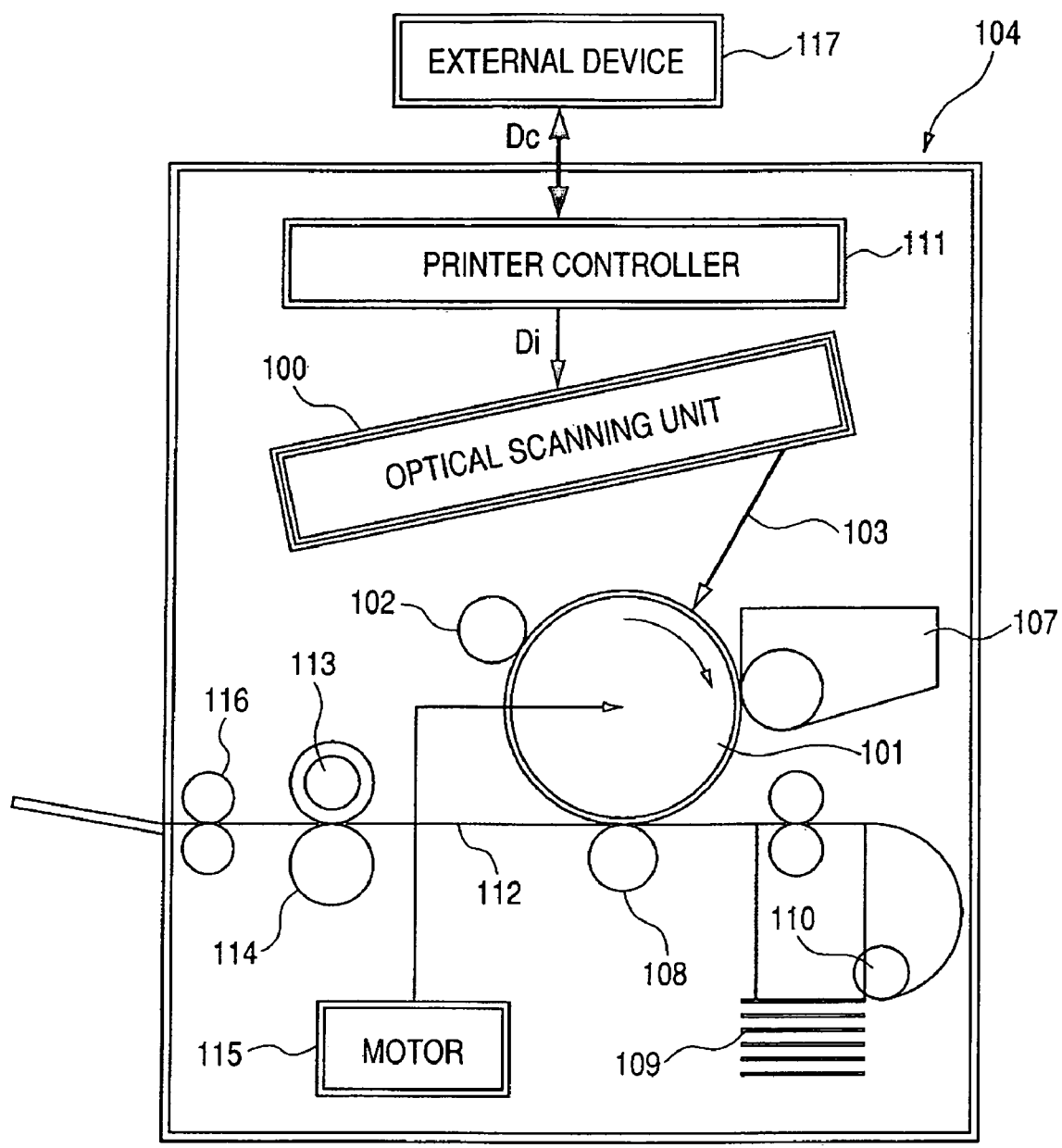
FIG. 8 is a sub-scanning cross-sectional view showing an embodiment of the image forming apparatus of the present invention.

FIG. 8 is a cross-sectional view of essential portions in the sub-scanning direction showing an embodiment of the image forming apparatus of the present invention. In FIG. 8, the reference numeral 104 designates the image forming apparatus. Code data Dc is inputted from an external device 117 such as a personal computer to this image forming apparatus 104. The code data Dc is converted into image data (dot data) Di by a printer controller 111 in the apparatus. The image data Di is inputted to an optical scanning unit (scanning optical apparatus) 100 having the construction shown in one of Embodiments 1 and 2. Then, a light beam 103 modulated in conformity with the image data Di is emitted from this optical scanning unit 100, and the photosensitive surface of a photosensitive drum 101 is scanned in the main scanning direction by this light beam 103.

The photosensitive drum 101 which is an electrostatic latent image bearing member (photosensitive member) is clockwisely rotated by a motor 115. Then, with this rotation, the photosensitive surface of the photosensitive drum 101 is moved relative to the light beam 103 in the sub-scanning direction orthogonal to the main scanning direction. Above the photosensitive drum 101, a charging roller 102 for uniformly charging the surface of the photosensitive drum 101 is provided so as to contact with the surface of the photosensitive drum. Design is made such that the light beam 103 with which the optical scanning unit 100 scans is applied to the surface of the photosensitive drum 101 charged by the charging roller 102.

As previously described, the light beam 103 is modulated on the basis of the image data Di, and this light beam 103 is applied to the surface of the photosensitive member 101 to thereby form an electrostatic image thereon. This electrostatic latent image is developed as a toner image by a developing device 107 disposed so as to contact with the photosensitive drum 101 on the further downstream side of the applying position of the light beam 103 with respect to the rotation direction of the photosensitive drum 101.

The toner image developed by the developing device 107 is transferred onto a sheet 112 which is a transfer material by a transfer roller 108 disposed below the photosensitive drum 101 so as to be opposed to the photosensitive drum 101. The sheet 112 is contained in a sheet cassette 109 forward (at the right viewed in FIG. 8) of the photosensitive drum 101, but sheet feeding can also be effected manually. A sheet feeding roller 110 is disposed on an end portion of the sheet cassette 109 and feeds the sheet 112 in the sheet cassette 109 into a conveying path.

The sheet 112 to which the unfixed toner image has been transferred in the manner described above is further conveyed to a fixing device rearward (at the left as viewed in FIG. 8) of the photosensitive drum 101. The fixing device is constituted by a fixing roller 113 having a fixing heater (not shown) therein, and a pressure roller 114 disposed so as to be in pressure contact with this fixing roller 113, and heats the sheet 112 conveyed from the transfer device while pressurizing it by the pressure contact portion between the fixing roller 112 and the pressure roller 114, to thereby fix the unfixed toner image on the sheet 112. Sheet discharging rollers 116 are further disposed rearwardly of the fixing roller 113, and discharge the fixed sheet 112 out of the image forming apparatus.

Although not shown in FIG. 8, the printer controller 111 effects not only the conversion of the data described previously, but the control of various portions in the image forming apparatus including a motor 115, and a light deflector, etc. in an optical scanning unit which will be described later.

The recording density of the image forming apparatus used in the present invention is not particularly restricted. However, considering that the higher becomes the recording density, the higher quality of image is required, the constructions of Embodiments 1 to 3 of the present invention display a greater effect.

[Color Image Forming Apparatus]

Figure 9:
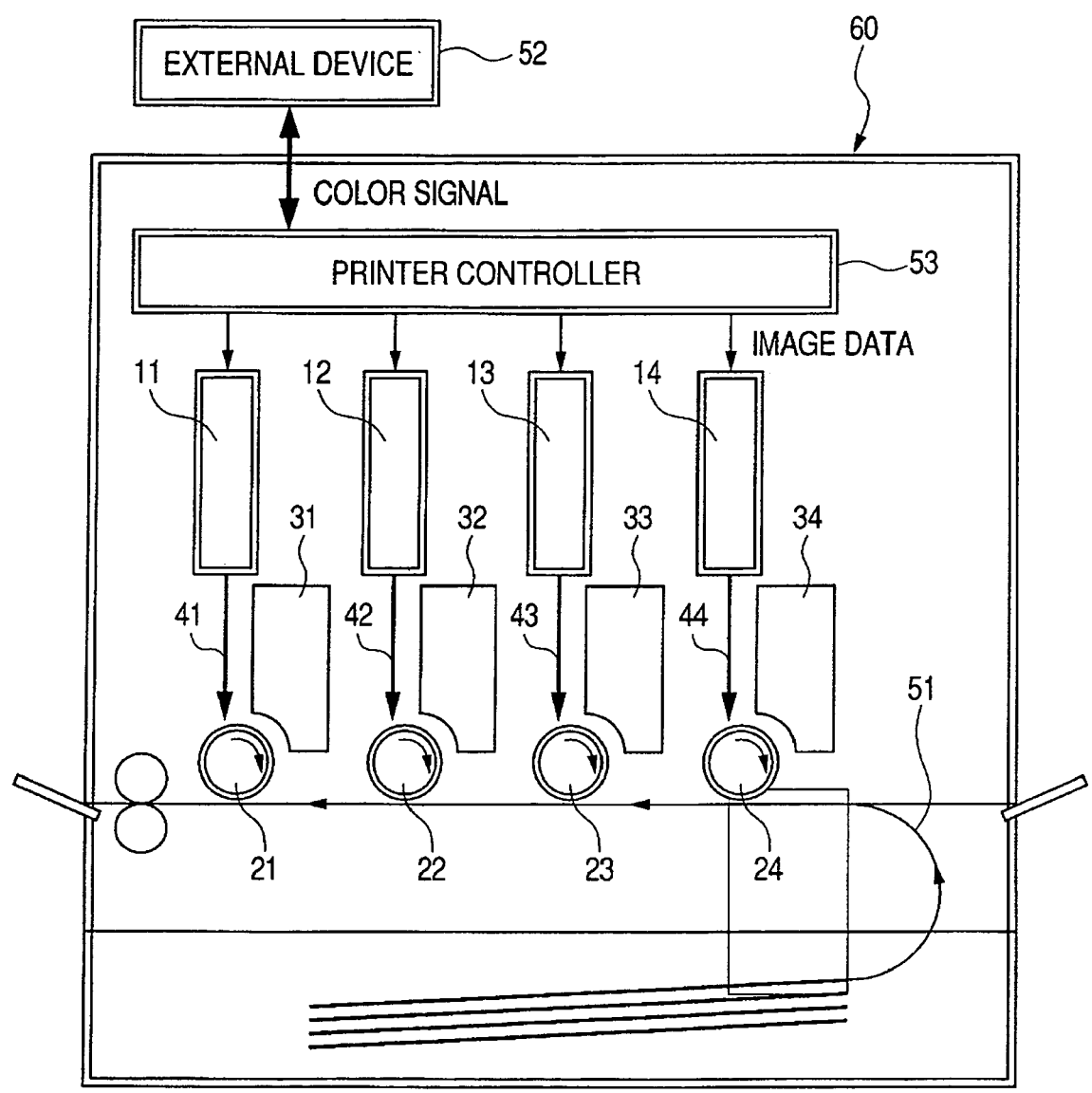
FIG. 9 is a sub-scanning cross-sectional view showing an embodiment of the color image forming apparatus of the present invention.
Figure 10:
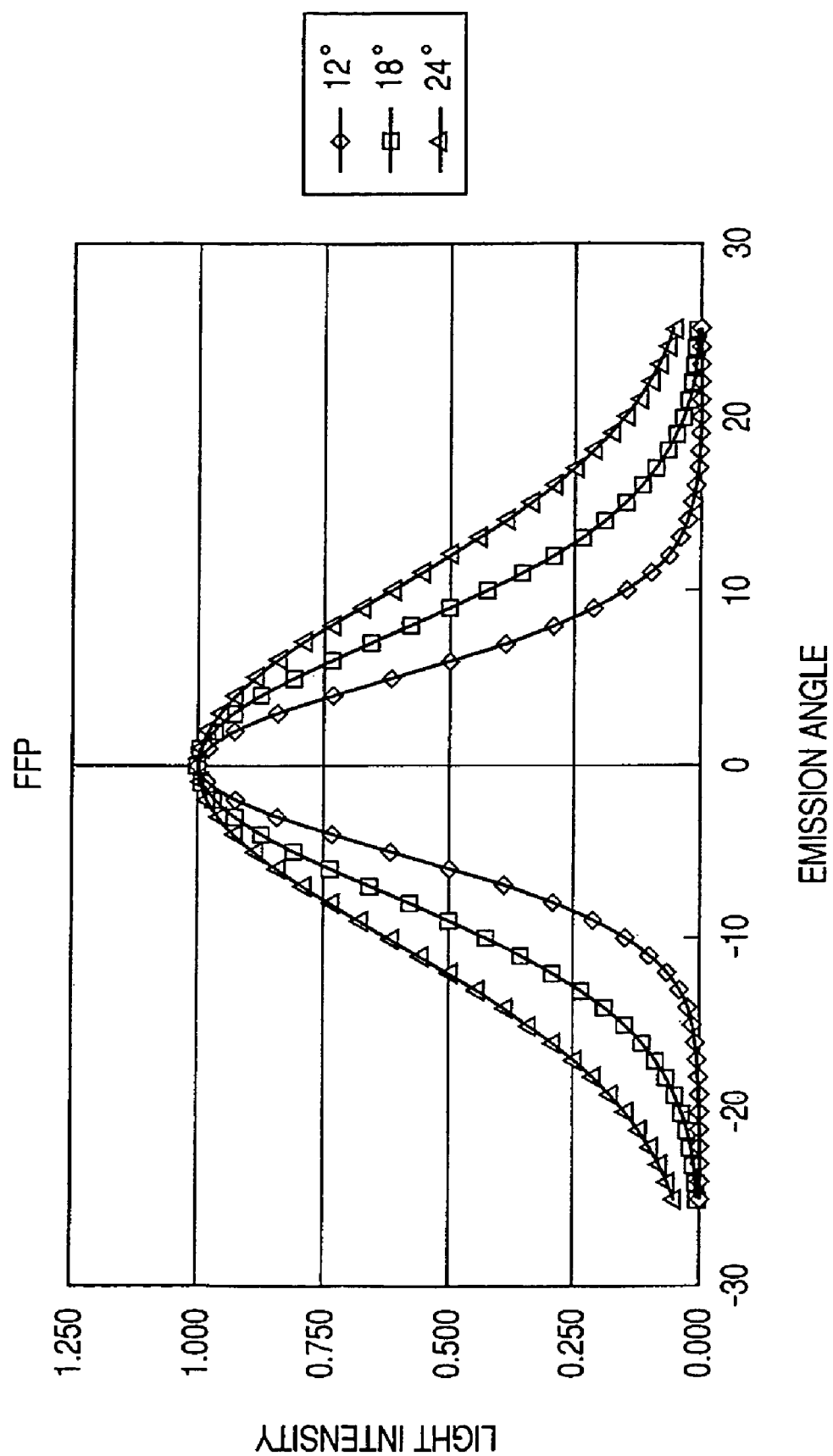
FIG. 10 illustrates FFP.
Figure 11:
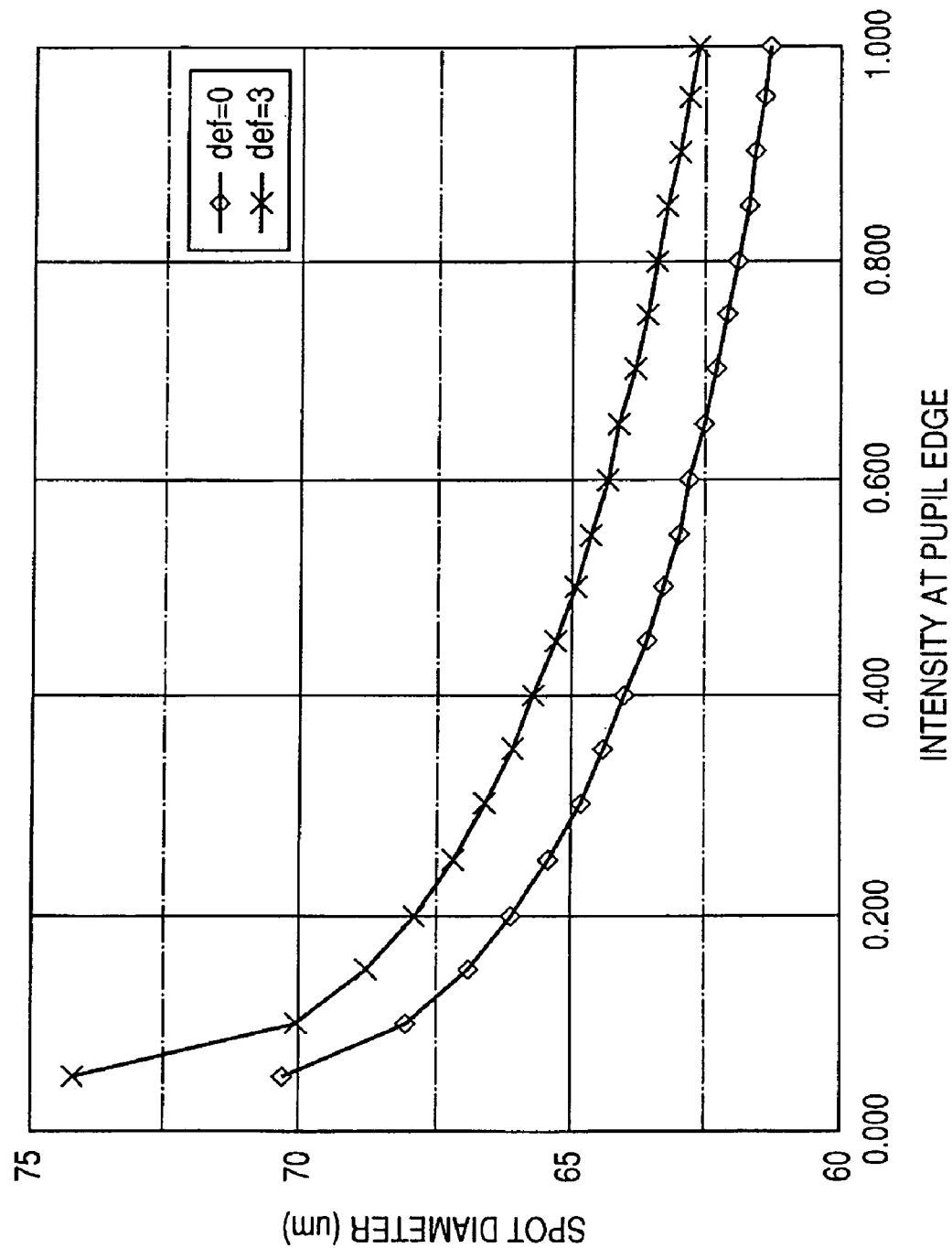
FIG. 11 illustrates the relation between the ratio of the quantity of light of a pupil edge portion and a spot diameter.
Figure 12:
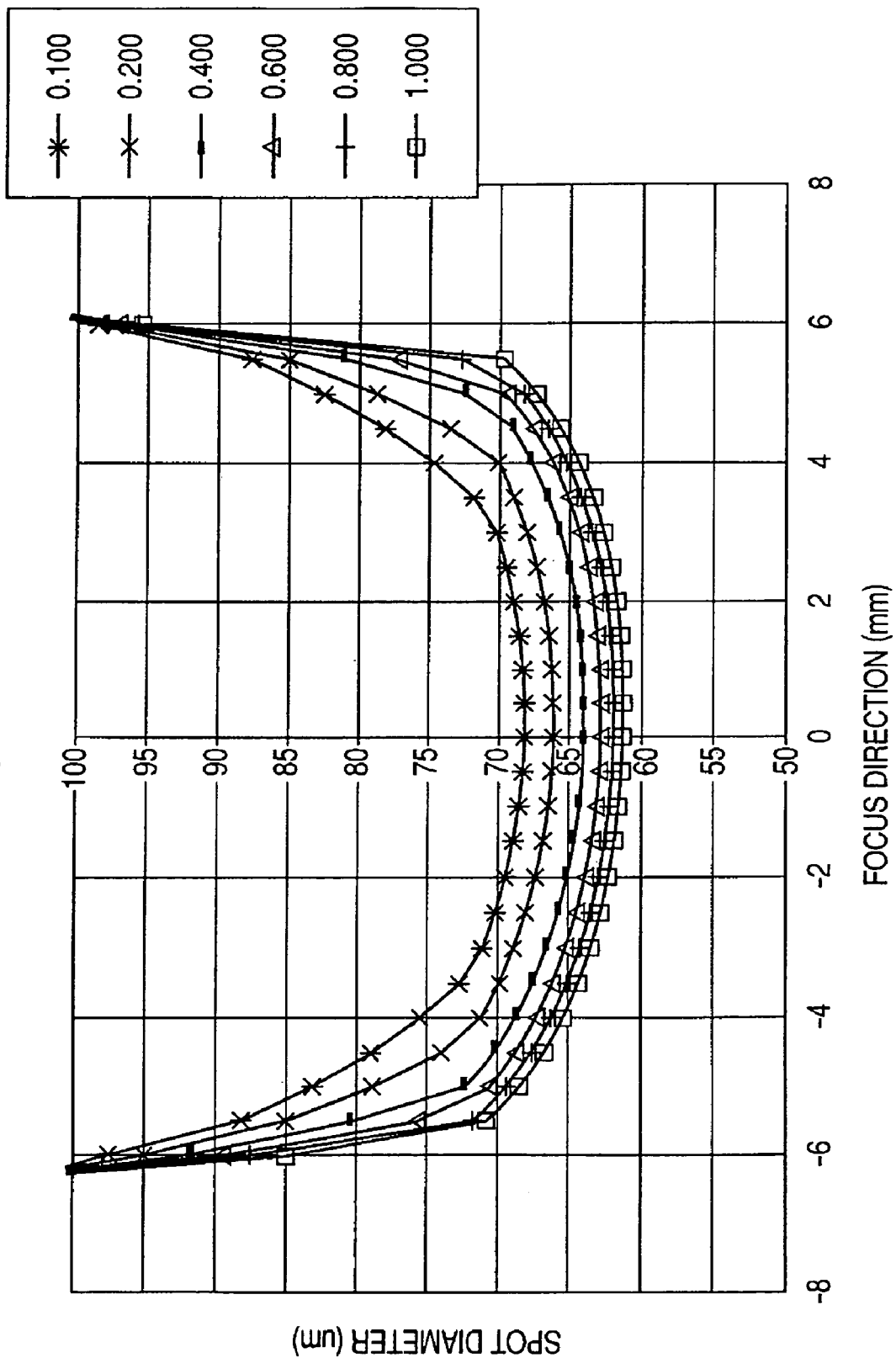
FIG. 12 illustrates the relation between the ratio of the quantity of light of the pupil edge portion and a spot defocus characteristic.

FIG. 9 is a schematic view of the essential portions of a color image forming apparatus according to an embodiment of the present invention. The present embodiment is a color image forming apparatus of a tandem type in which four scanning optical apparatuses are juxtaposed and image information is recorded on the surfaces of photosensitive drums which are image bearing members. In FIG. 9, the reference numeral 60 designates the color image forming apparatus, the reference numerals 11, 12, 13 and 14 denote scanning optical apparatuses having the construction shown in Embodiment 1 or 2, the reference numerals 21, 22, 23 and 24 designate photosensitive drums as image bearing members, the reference numerals 31, 32, 33 and 34 denote developing devices, and the reference numeral 51 designates a conveying belt.

In FIG. 9, color signals of R (red), G (green) and B (blue) are inputted from an external device 52 such as a personal computer to the color image forming apparatus 60. These color signals are converted into C (cyan), M (magenta), Y (yellow) and K (black) image data (dot data) by a printer controller 53 in the apparatus. These image data are inputted to the scanning optical apparatuses 11, 12, 13 and 14, respectively. Then, light beams 41, 42, 43 and 44 modulated in conformity with the respective image data are emitted from these scanning optical apparatuses, and the photosensitive surfaces of the photosensitive drums 21, 22, 23 and 24 are scanned in the main scanning direction with these light beams.

The color image forming apparatus according to the present embodiment has the four scanning optical apparatuses (11, 12, 13 and 14) juxtaposed therein, and records image signals (image information) on the surfaces of the photosensitive drums 21, 22, 23 and 24 correspondingly to the respective colors C (cyan), M (magenta), Y (yellow) and K (black) to thereby print a color image at a high speed.

The color image forming apparatus according to the present embodiment, as described above, forms latent images of the respective colors on the surfaces of the corresponding photosensitive drums 21, 22, 23 and 24 by the four scanning optical apparatuses 11, 12, 13 and 14 by the use of light beams based on the respective image data. Thereafter, it multiplexly transfers the images to a recording material to thereby form a sheet of full-color image.

As the external device 52, use may be made, for example, of a color image reading device provided with a CCD sensor. A color digital copying machine is constituted by this color image reading device and the color image forming apparatus 60.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-280428 filed on Sep. 27, 2005, which is hereby incorporated by reference herein.

What is claimed is:

1. A scanning optical apparatus comprising:

light source means;

a converting optical system for converting a light beam emitted from the light source means into a light beam of another state;

deflecting means for deflecting the light beam and for scanning with the light beam passed through the converting optical system; and an imaging optical system for directing the light beam deflected by the deflecting means onto a surface to be scanned;

wherein the light source means is a vertical cavity surface emitting laser having a plurality of light emitting points, and either of the following pairs of conditional expressions $3 \leq Fnos < Fnom \leq 15$ and $d\theta s/dT < d\theta m/dT$ or $3 \leq Fnom < Fnos \leq 15$ and $d\theta m/dT < d\theta s/dT$ is satisfied, where Fnom and Fnos represent the F number of the light source means side of the converting optical system in a main scanning direction and the F number thereof in a sub-scanning direction, respectively, $\theta m$ and $\theta s$ represent the half value angle of the far field pattern of the light beam emitted from the light source means in the main scanning direction and the half value angle of the far field pattern thereof in the sub-scanning direction, respectively, and $d\theta m/dT$ and $d\theta s/dT$ represent the fluctuations of the half value angles $\theta m$ and $\theta s$ of the far field pattern due to change in environmental temperature dT, respectively.

2. A scanning optical apparatus according to claim 1, further comprising a stop member for regulating the light beam from said converting optical system, wherein the following conditional expression is satisfied, $0.35 < \eta < 1$, where η represents a ratio of an intensity of pupil edge portion of light beam passing through the stop member to an intensity of pupil center thereof.

3. A scanning optical apparatus according to claim 1, wherein the following conditional expression is satisfied, $0.50 < \eta < 1$.

4. A scanning optical apparatus according to claim 1, wherein the following conditional expression is satisfied, $182°/(Fno+5.5)-7.9° < \theta$, where Fno represents the smaller one of the F number Fnom of the light source means side of said converting optical system in the main scanning direction and the F number Fnos thereof in the sub-scanning direction, and θ represents the half value angle of said far field pattern of the light beam emitted from said light source means in the direction of the smaller F number.

5. A scanning optical apparatus according to claim 4, wherein the following conditional expression is satisfied, $412°/(Fno+9.9)-15.6° < \theta$.

6. An image forming apparatus, comprising:
a scanning optical apparatus according to claim 1;
a photosensitive member disposed on said surface to be scanned;
a developing device for developing an electrostatic latent image formed on the photosensitive member by the light beam with which the scanning optical apparatus scans as a toner image;
a transfer device for transferring the developed toner image to a transfer material; and
a fixing device for fixing the transferred toner image on the transfer material.

7. An image forming apparatus, comprising:
a scanning optical apparatus according to claim 1; and
a printer controller for converting code data inputted from an external device into an image signal and inputting it to the scanning optical apparatus.

8. A color image forming apparatus having a plurality of image bearing members disposed on the respective surfaces to be scanned of said scanning optical apparatus according to claim 1 for forming images of different colors thereon.

9. A color image forming apparatus according to claim 8, having a printer controller for converting a color signal inputted from an external device into image data of different colors and inputting them to the respective scanning optical apparatuses.

10. A scanning optical apparatus comprising:
light source means;
a converting optical system for converting a light beam emitted from the light source means into a light beam of another state;
deflecting means for deflecting the light beam and scanning with the light beam passed through the converting optical system; and
an imaging optical system including an imaging optical element made of resin for directing the light beam deflected by the deflecting means onto a surface to be scanned;

wherein the light source means is a vertical cavity surface emitting laser having a plurality of light emitting points, and assuming that the fluctuation of a focus in a sub-scanning direction on the surface to be scanned due to change in an environmental temperature is greater than that in a main scanning direction, the following conditions are satisfied, $d\theta m/dT < d\theta s/dT$, and $dSpot\_FFP/dT \times dSpot\_pint/dT < 0$, where θm and θs represent the half value angle of the far field pattern of the light beam emitted from the light source means in the main scanning direction and the half value angle of the far field pattern thereof in the sub-scanning direction, respectively, d θm/dT and d θs/dT represent the fluctuations of the half value angles θm and θs of the far field pattern when environmental temperature changes by dT, respectively, dSpot_FFP/dT represents the fluctuation of a spot diameter on the surface to be scanned due to the fluctuation of the half value angle of the far field pattern when the environmental temperature changes by dT, and dSpot_pint/dT represents the fluctuation of the spot diameter due to the fluctuation of a focus on the surface to be scanned when the environmental temperature changes by dT.

11. An image forming apparatus, comprising:
a scanning optical apparatus according to claim 10;
a photosensitive member disposed on said surface to be scanned;
a developing device for developing an electrostatic latent image formed on the photosensitive member by the light beam with which the scanning optical apparatus scans as a toner image;
a transfer device for transferring the developed toner image to a transfer material; and
a fixing device for fixing the transferred toner image on the transfer material.

12. An image forming apparatus, comprising:
a scanning optical apparatus according to claim 10, and
a printer controller for converting code data inputted from an external device into an image signal and inputting it to said scanning optical apparatus.

13. A color image forming apparatus having a plurality of image bearing members disposed on the respective surfaces to be scanned of said scanning optical apparatuses according to claim 10 for forming images of different colors thereon.

14. A color image forming apparatus according to claim 13, having a printer controller for converting a color signal inputted from an external device into image data of different colors and inputting them to the respective scanning optical apparatuses.

* * * * *

UNITED STATES PATENT AND TRADEMARK OFFICE
CERTIFICATE OF CORRECTION

PATENT NO. : 7,193,762 B1
APPLICATION NO. : 11/518241
DATED : March 20, 2007
INVENTOR(S) : Kazumi Kimura It is certified that error appears in the above-identified patent and that said Letters Patent is hereby corrected as shown below:

COLUMN 12

Line 50, " $S = \dfrac{Z^2/r'}{1 + (1 - Z/r')^2)^{12}}$ " should read

-- $S = \dfrac{Z^2/r'}{1 + (1 - Z/r')^2)^{1/2}}$ --.

COLUMN 17

Line 2, "sub-sub-scanning" should read --sub-scanning--.

COLUMN 21

In Table 4, "1.44-E11" should read --1.44E-11--, and "7.86-E16" should read --7.86E-16--.

Signed and Sealed this

Twenty Second Day of April, 2008

JON W. DUDAS
*Director of the United States Patent and Trademark Office*